US012392644B2

(12) United States Patent
McCaffrey et al.

(10) Patent No.: US 12,392,644 B2
(45) Date of Patent: Aug. 19, 2025

(54) HINGED CLOSURE FOR GAS PYCNOMETER

(71) Applicant: Micromeritics Instrument Corporation, Norcross, GA (US)

(72) Inventors: John McCaffrey, Duluth, GA (US); Jeff Kenvin, Roswell, GA (US); Kyle Mascaritolo, Peachtree Corners, GA (US); Brian Arnhart, Acworth, GA (US); Jordan Hinson, Lawrenceville, GA (US); Philip Remedios, Palm Harbor, FL (US); Jesse Knight, Clearwater, FL (US); Bartosz Korec, Palm Harbor, FL (US)

(73) Assignee: Micromeritics Instruments Corporation, Norcross, GA (US)

( * ) Notice: Subject to any disclaimer, the term of this patent is extended or adjusted under 35 U.S.C. 154(b) by 262 days.

(21) Appl. No.: 18/103,565

(22) Filed: Jan. 31, 2023

(65) Prior Publication Data

US 2023/0243675 A1     Aug. 3, 2023

Related U.S. Application Data

(60) Provisional application No. 63/305,295, filed on Feb. 1, 2022.

(51) Int. Cl.
  *G01D 11/24* (2006.01)
  *G01N 9/02* (2006.01)
(52) U.S. Cl.
  CPC .......... *G01D 11/245* (2013.01); *G01N 9/02* (2013.01); *G01N 2009/028* (2013.01)

(58) Field of Classification Search
  CPC ... G01D 11/245; G01N 9/02; G01N 2009/028
  See application file for complete search history.

(56) References Cited

U.S. PATENT DOCUMENTS

| 4,699,002 A | 10/1987 | Rockley |
| 5,004,590 A | 4/1991 | Schimpf |
| 5,074,146 A | 12/1991 | Orr et al. |

(Continued)

FOREIGN PATENT DOCUMENTS

| JP | H09133625 A | * | 5/1997 |
| WO | WO2021/105793 A1 | | 6/2021 |

OTHER PUBLICATIONS

International Search Report and the Written Opinion of the International Search Authority for PCT/US2023/011949, mailed May 26, 2023.

(Continued)

*Primary Examiner* — Jamel E Williams
(74) *Attorney, Agent, or Firm* — Womble Bond Dickinson (US) LLP

(57) ABSTRACT

A device including a housing having an access opening, a swing arm mounted to the housing and configured to be selectively pivoted toward and away from the access opening, and a closure captured by the swing arm. The closure can be configured to be selectively moved in a substantially vertical motion relative to the swing arm between a retracted position and an inserted position at least partially in the access opening and can have locking features for cooperating with engagement features in the device to move the closure into a closed and sealed configuration.

20 Claims, 22 Drawing Sheets

(56) References Cited

U.S. PATENT DOCUMENTS

| | | | |
|---|---|---|---|
| 5,128,104 A * | 7/1992 | Murphy | G01N 21/03 422/547 |
| 5,683,659 A * | 11/1997 | Hovatter | B01L 3/5082 422/550 |
| 6,387,704 B1 | 5/2002 | Thomas et al. | |
| 6,595,036 B1 | 7/2003 | Nakai | |
| 2004/0036867 A1 | 2/2004 | Jedamzik et al. | |
| 2005/0042145 A1* | 2/2005 | Ueda | G01N 21/03 422/400 |
| 2010/0269577 A1 | 10/2010 | Jorion et al. | |
| 2016/0279662 A1* | 9/2016 | Reuter | G01F 11/021 |
| 2017/0010196 A1* | 1/2017 | Nakai | G01N 9/26 |
| 2017/0030817 A1 | 2/2017 | Nakai et al. | |
| 2022/0349743 A1 | 11/2022 | Kenvin et al. | |

OTHER PUBLICATIONS

Instruquest Inc. Scientific Instruments R&D; http://www.instruquest.com/CalibrationKit.html; Feb. 19, 2020 [retrieved on Aug. 16, 2022].

Micromeritics Instrument Corporation; https://www.micromerities.com/accupyc-ii/; AccuPyc II; Gas Displacement Pycnometry System; Website; Copyright 2023.

Anton Paar; *Anton Paar Ultrapyc; Gas Pycnometer for Semi-Solid and Solid Density: Ultrapyc :: Anton-Paar.com*; Gas Pycnometer for Semi-Solid and Solid Density: Ultrapyc; Website; Copyright 2023.

International Search Report and the Written Opinion of the International Searching Authority for PCT/US22/26266, mailed Aug. 11, 2022.

* cited by examiner

HINGED CLOSURE FOR GAS PYCNOMETER

CROSS-REFERENCE TO RELATED APPLICATIONS

This application claims benefit of priority from U.S. Provisional Application No. 63/305,295, titled HINGED CLOSURE FOR GAS PYCNOMETER, which was filed Feb. 1, 2022, which application is hereby incorporated by reference.

TECHNICAL FIELD

In one aspect, the present disclosure is directed to a hinged closure for a measurement device, and more specifically, to a hinged closure of a gas pycnometer or gas adsorption analyzer (herein referred to as pycnometric device), wherein the hinged closure has features configured to facilitate efficient closing and sealing of the pycnometric device. Other aspects also are described.

BACKGROUND

Gas pycnometers are used to non-destructively measure the volume of various materials, e.g., powders, slurries, porous materials, etc., and determine various properties thereof, such as a true density of the materials being measured, and similarly gas adsorption analyzers are used to nondestructively measure the quantity of a fluid that may be adsorbed by powders and porous materials. In general, the operation of a pycnometric device can include placing a sample into a sample chamber of known volume, sealing the sample chamber, and admitting a gas (e.g., an inert gas such as nitrogen or helium). When equilibrium is reached in the sample chamber, the inlet of the sample chamber is closed and the gas is allowed to flow into a reference chamber having a known precision internal volume. The sample solid phase volume can be determined/computed using the pressure observed upon filling the sample chamber and the pressure observed after discharging the gas to the reference chamber. Further, the sample mass can be divided by the measured solid phase volume of the sample to determine the density of the sample.

Pycnometric devices generally include a closure that can be removed to provide access to the sample chamber for inserting or removing a sample, which closure can be locked in place to seal the sample chamber so that the sample chamber can be pressurized. However, after being removed, most such removable closures are either held in the user's hand or placed on a surface while loading or removing a sample, creating a risk of contamination of the sealing features of the closure, e.g., by small particles or other contaminants collecting on the sealing surface, which can interfere with the formation of a proper seal of the closure and/or can cause degradation of the sealing features. Thus, there is a need for a closure for a pycnometric device that is simple and efficient to operate without risking contamination of the sealing features of the closure due to surface transfer.

Accordingly, the present disclosure is directed to embodiments of a pycnometric device and a closure for a pycnometric device that address the foregoing and other related, and unrelated, problems in the relevant art.

SUMMARY

Briefly described, the present disclosure includes systems and methods for opening and closing/sealing a chamber in devices such as gas pycnometers or gas adsorption analyzers. In some aspects, the device can include a closure that is captured by a swing arm. The swing arm can be mounted to the housing of the device by a hinge so that the swing arm and the captured closure can pivot between a closed configuration and an open configuration. A bearing can be engaged between the closure and the swing arm to facilitate moving the closure along its axis between a retracted position and an inserted and closed position. The closure can be moved to the retracted position during pivoting of the swing arm, the swing arm being configured to help align the closure with an access opening of the device and with engaging features and a sealing surface of the device while the closure is moved linearly (e.g., vertically) between the retracted position and the inserted position.

In an additional aspect, the closure can include locking features that cooperate with engagement features in the interior of the device for moving the closure into sealing engagement with the sealing surface in the device and for securing the closure in the closed and sealed configuration.

It is also optionally contemplated that the bearing can be spring-loaded or otherwise biased to provide a substantially vertical motion to the closure when above the sealing surface of the device. The bearing can allow rotational movement of the closure relative to the opening of the device via the swing arm during engagement and/or disengagement between the locking features of the closure and the engagement features of the device. In the open configuration, with the swing arm pivoted away from the access opening, the swing arm can hold the closure away from potentially contaminating surfaces, freeing up the user's hands during loading and/or unloading of samples into or from the device. A single hinge can be utilized for pivoting the closure via the swing arm to a closed position wherein the closure intuitively engages against the sealing surface of the device.

Accordingly, in one aspect, the present disclosure is directed to a device, such as a pycnometric device. The device can include a housing having an access opening, a swing arm mounted to the housing by a hinge, wherein the swing arm is configured to be selectively pivoted toward and away from the access opening, and a closure captured by the swing arm. The closure is configured to be selectively moved relative to the swing arm between a retracted position and an inserted position at least partially in the access opening and can have locking features for cooperating with engagement features in the device to move the closure into a closed and sealed configuration. In embodiments, the swing arm can have a varied length to conform movement of the closure to its closed position in engagement with the sealing surface for devices with different size sample chambers, such as, for example and without limitation, 1 cc sample size chambers up to 100 cc sample size chambers.

Another aspect of the disclosure is directed to a method of closing a device such as a pycnometric device. The method can include pivoting a swing arm about a hinge toward an access opening in a housing of the device, wherein a closure is captured by the swing arm. The method further can include moving the closure from a retracted position to an inserted and/or closed position relative to the swing arm with the closure at least partially received in the access opening and biasing the closure in a substantially vertical motion such that locking features of the closure are brought into engagement with engagement features in the device to move the closure to a closed and sealed configuration. In addition, the disclosure can include a method of opening the device.

In one optional aspect, the pycnometric device can include a housing having an access opening and a swing arm mounted to the housing by a hinge, such that the swing arm is configured to be selectively pivoted toward and away from the access opening, In this aspect, the pycnometric device can further include a closure captured by the swing arm, such that the closure is configured to be selectively moved relative to the swing arm between a retracted position and an inserted position at least partially in the access opening.

In various aspects, the closure in this example can include locking features that are configured for cooperating with engagement features that extend at least partially within the housing when the closure is moved into a closed and sealed configuration. In this exemplary aspect, the locking features of the closure can include a cam plate and the engagement features that extend at least partially within the housing can include a cam follower extending in a locking recess within the housing, and wherein the cam follower cooperates with the cam plate to facilitate moving a sealing portion of the closure into sealing contact around a sample chamber of the pycnometric device when the closure is moved to the closed and sealed configuration.

In this exemplary aspect, the swing arm can be mounted to the housing by a hinge and can include a support cylinder configured to engage the closure, a support flange that projects outwardly from the support cylinder, and a hinge extension that extends from the support flange and/or the support cylinder to the hinge.

In this exemplary aspect, the closure can further include a closure shaft configured to be at least partially received in the support cylinder. In this aspect, it is contemplated that a bearing can be mounted between the support cylinder and the closure shaft for facilitating or otherwise allowing selective linear and/or rotational movement of the closure shaft relative to the support cylinder.

In this exemplary aspect, the pycnometric device can further include an insulation block at least partially extending into the housing. In this aspect, the engagement features can define a locking recess that extends at least partially within the housing for at least partially complementary receiving the locking features of the closure. Optionally, the closure can further comprise a seal plate that can be configured to at least partially seal against the insulation block such that the locking recess is at least partially sealed when the closure is positioned in the closed and sealed configuration.

In one optional aspect, the pycnometric device can be operated by a) pivoting a swing arm about a hinge toward an access opening in a housing of the device such that a closure is captured by the swing arm; and by b) moving the closure from a retracted position to an inserted and/or closed position relative to the swing arm with the closure being at least partially received in the access opening. In this operational aspect, the closure can be biased in a substantially vertical motion such that locking features of the closure can be brought into engagement with engagement features in the device to move the closure to a closed and sealed configuration.

The pycnometric device can be operated by moving the closure from the inserted position to the closed and sealed position by engaging the cam follower with the cam plate and rotating at least the cam plate so that the engagement between the cam follower and the cam plate causes a sealing portion of the closure to move into sealing contact around a sample chamber of the pycnometric device. In engagement, it is contemplated that movement of the closure from the retracted position to the inserted and/or closed position comprises would bring a seal plate into at least partially sealing contact with an insulation block at least partially extending in the housing to at least partially seal a locking recess.

Still other aspects and advantages of these embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the various aspects and embodiments disclosed herein. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than can be necessary for a fundamental understanding of the exemplary embodiments discussed herein and the various ways in which they can be practiced. According to common practice, the various features of the drawings discussed below are not necessarily drawn to scale. Dimensions of various features and elements in the drawings can be expanded or reduced to more clearly illustrate the embodiments of the disclosure. The use of the same reference symbols in different drawings indicates similar or identical items.

DETAILED DESCRIPTION

Figure 1:
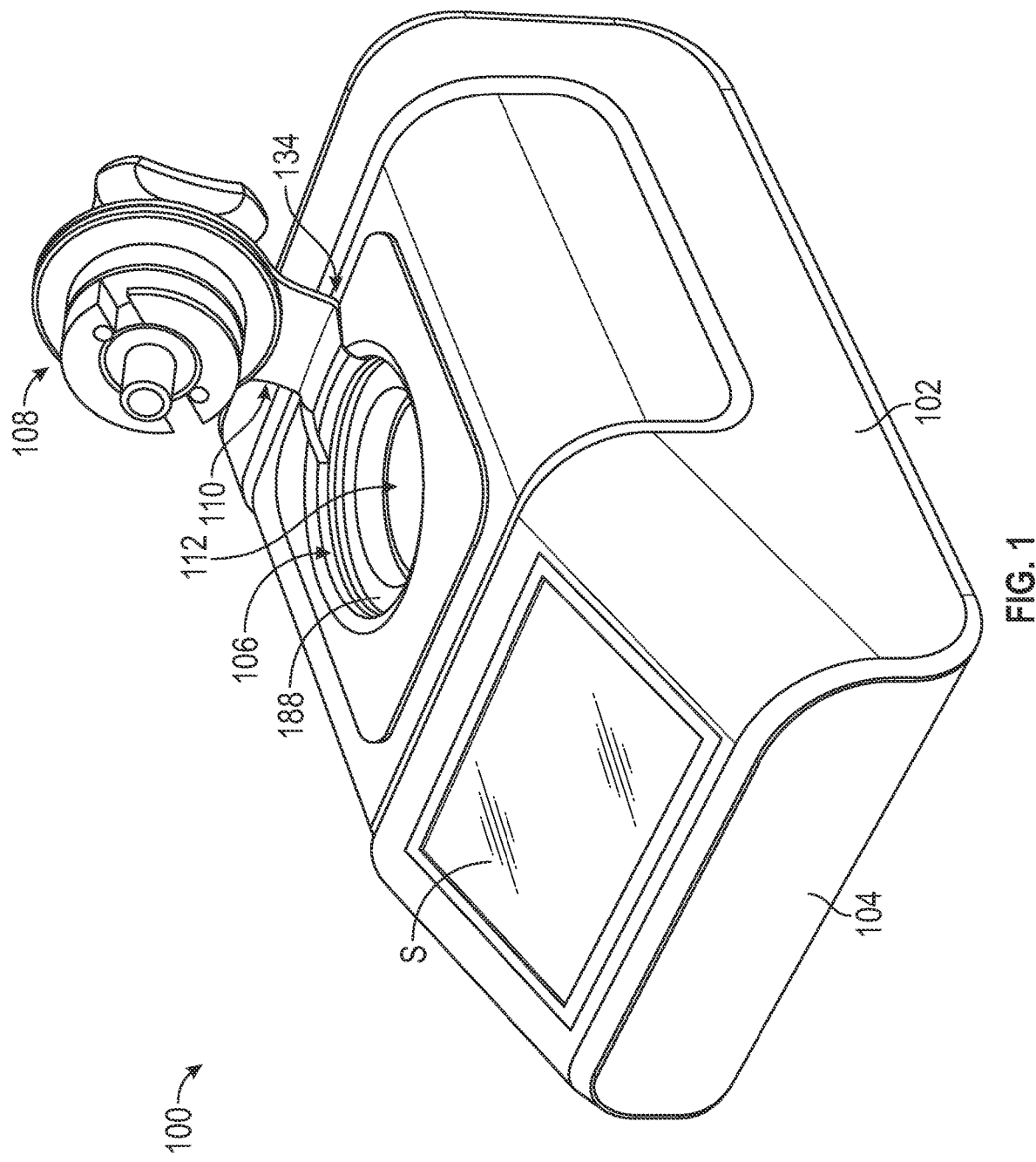
FIGS. 1 and 2 are schematic isometric views of a pycnometric device according to embodiments of the present disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a cam follower" can include two or more such cam followers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Figure 2:
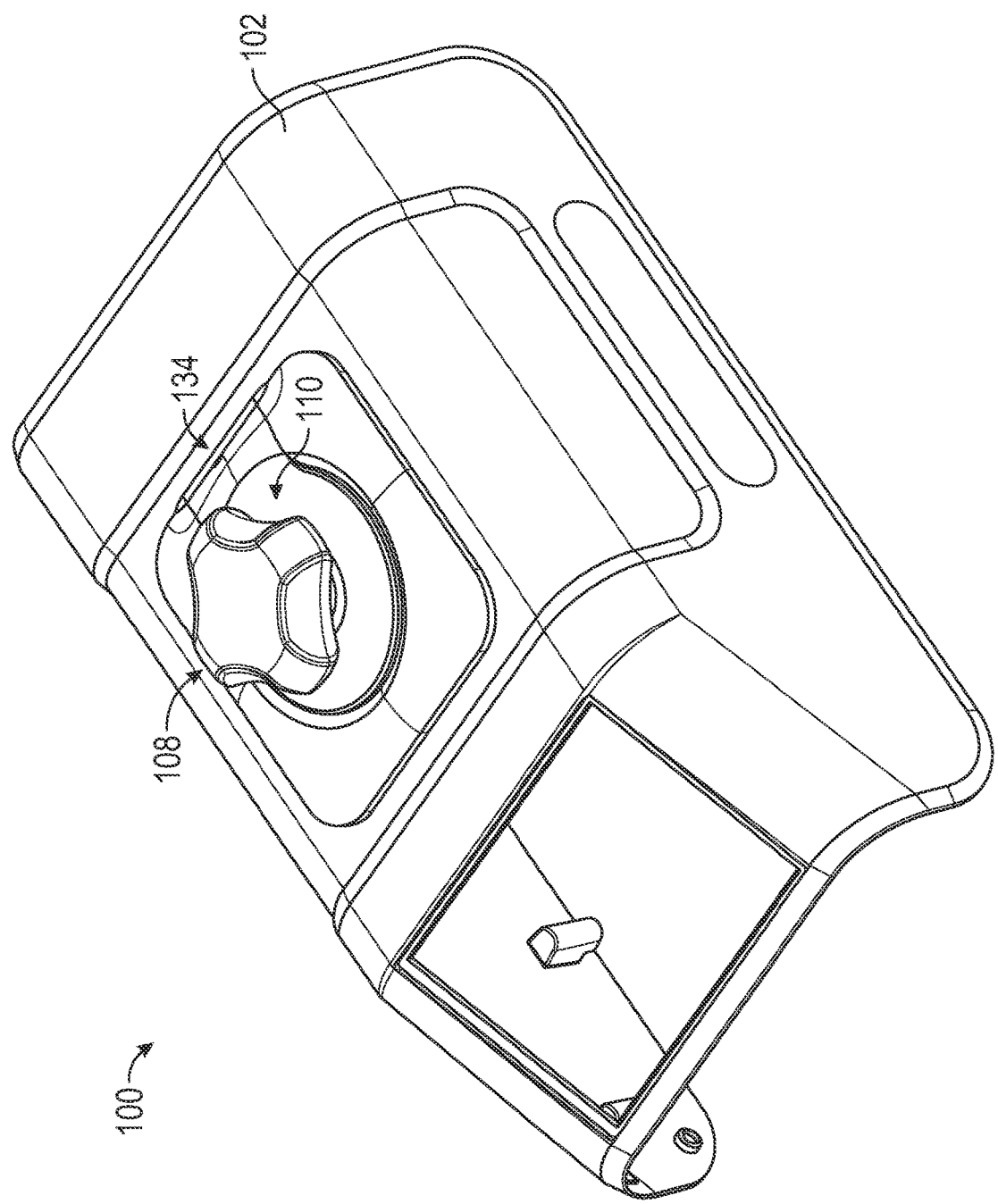

FIG. 1 is a view of a pycnometric device (e.g., a gas pycnometer or gas adsorption analyzer) 100 in an open configuration. In the illustrated embodiment, the pycnometric device 100 can include an upper housing 102 mounted to a lower housing 104, an access opening 106 in the upper housing 102, and a closure 108 captured by a swing arm hinge mount 110 that is mounted to the upper housing 102. As shown in FIG. 1, a user interface feature (e.g., a touch screen S or another interface) can be positioned along the upper housing 102. Alternatively, the interface feature could be otherwise located on the pycnometric device 100. In the open configuration of FIG. 1, the closure 108 and the swing arm hinge mount 110 are pivoted away from the access opening 106 so that at least a portion of the interior 112 of the pycnometric device 100 is accessible via the access opening 106. As shown in FIG. 2, the closure 108 and the swing arm hinge mount 110 can be pivoted toward the access opening 106 to move the pycnometric device 100 to an inserted, closed, or sealed configuration as described in more detail below.

Figure 3A:
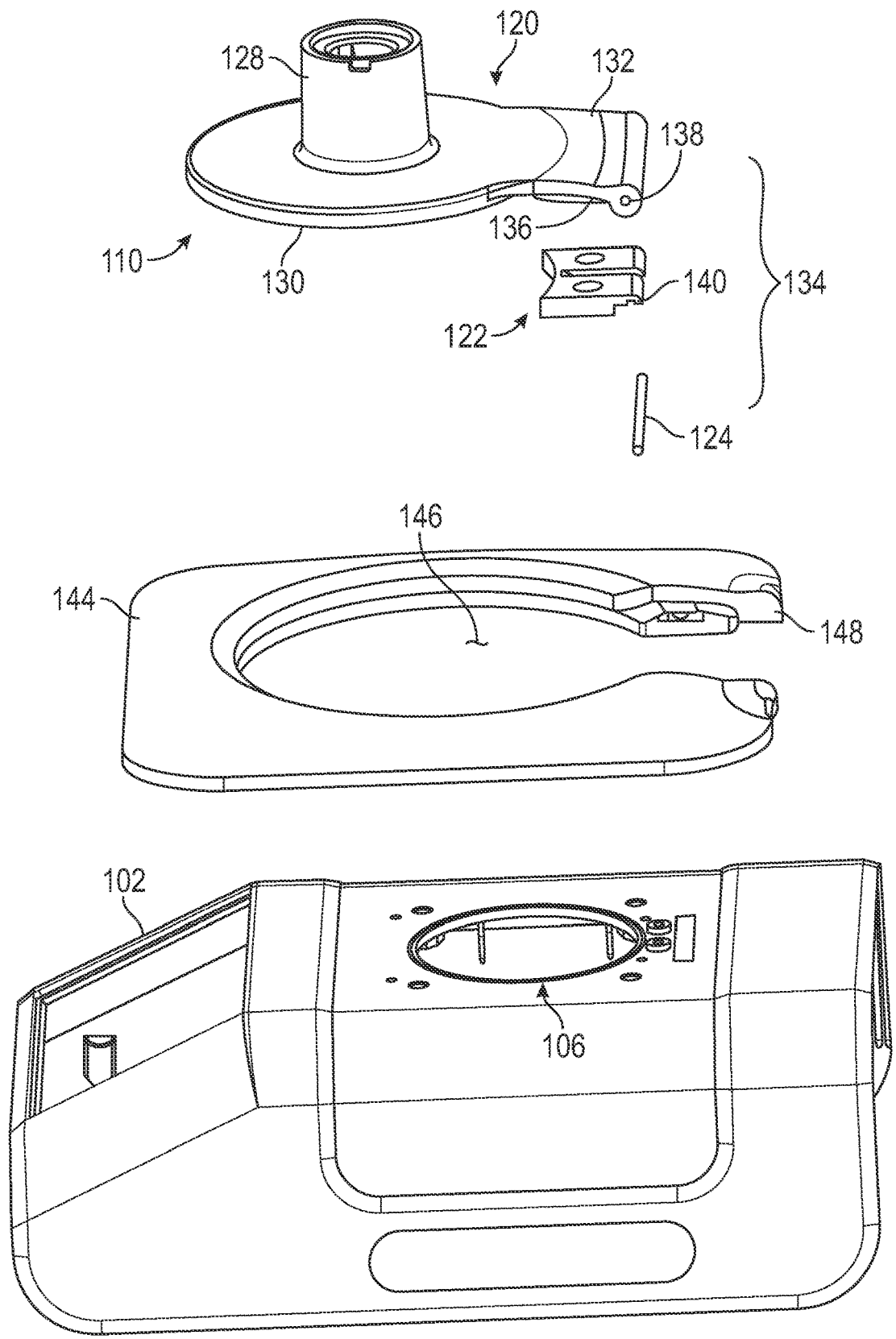
FIG. 3A is a schematic isometric view of portion of the pycnometric device of FIGS. 1 and 2 in an unassembled configuration.
Figure 3C:
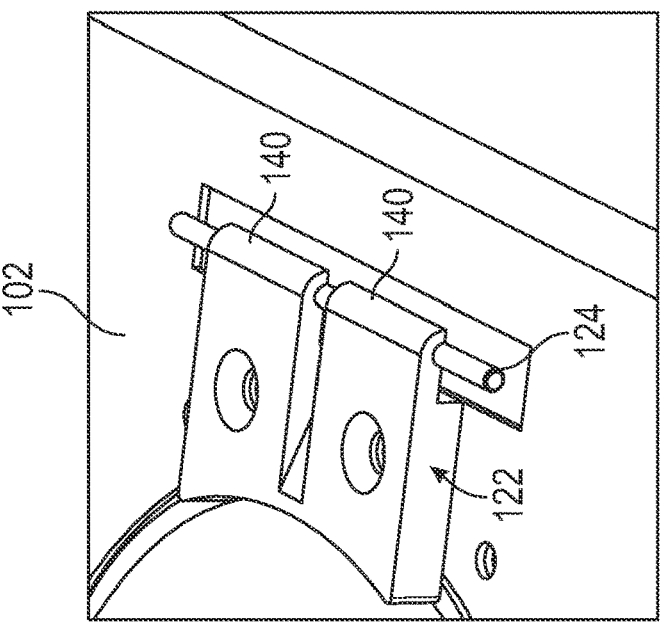
FIGS. 3B and 3C are schematic isometric views of portions of a swing arm hinge mount of the pycnometric device of FIGS. 1 and 2.
Figure 3B:
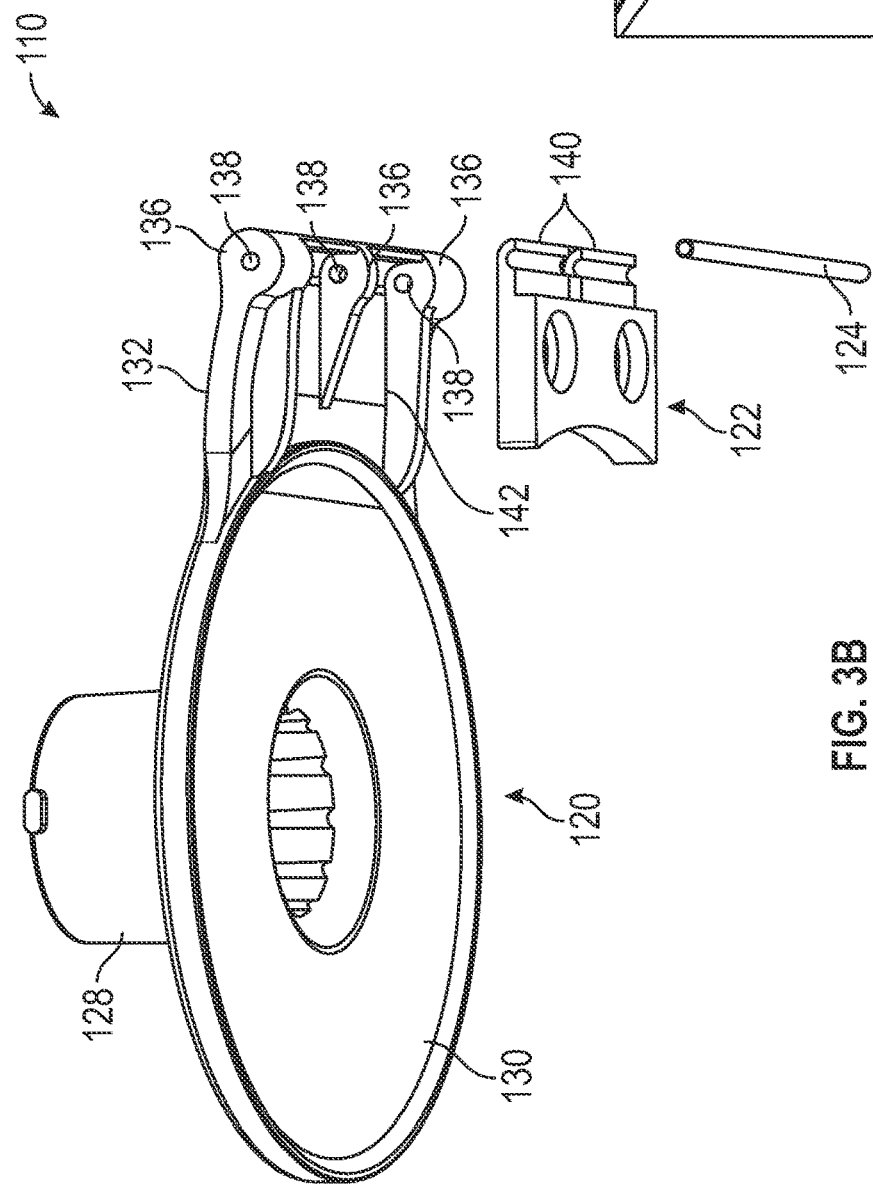

In embodiments, the swing arm hinge mount 110 is shown in an unassembled configuration in FIGS. 3A and 3B and includes a swing arm 120, a hinge mounting bracket 122, and a pivot rod 124. As shown in FIGS. 3A and 3B, the swing arm 120 can include a support cylinder 128, a support flange 130 extending outwardly from the base of the support cylinder 128, and a hinge extension 132 extending from the support flange 130. In embodiments, the hinge extension 132, the hinge mounting bracket 122, and the pivot rod 124 can cooperate to form a hinge 134 (FIGS. 1-4), about which the swing arm 120 can pivot. As shown in FIG. 3B, the hinge extension 132 can include one or more projections 136. While three projections are shown in the present embodiment, any suitable number of projections 136 can be used. As indicated, the projections 136 include apertures 138 that receive the pivot rod 124 (FIGS. 4B and 5). The hinge mounting bracket 122 can include two hook portions 140 or any suitable number of hook portions 140, each with a groove for receiving respective portions of the pivot rod 124 (e.g., FIG. 3C).

When assembled, the hinge mounting bracket 122 is mounted to an exterior surface of the upper housing 102 (FIG. 3C) such as by suitable fasteners (not shown), the swing arm 120 is positioned over the hinge mounting bracket 122 so that the hinge mounting bracket is at least partially received in a recess 142 of the hinge extension 132 of the swing arm 120 and the hook portions 140 of the hinge mounting bracket 122 are at least partially received between the projections 136 of the hinge extension 132 so that the grooves of the hook portions 140 are aligned with the apertures 138 in the projections 136. The pivot rod 124 can be inserted into the apertures 138 and under the grooves of the hook portions 140 so that the swing arm 120 is coupled to the hinge mounting bracket 122 via the pivot pin 124 and the swing arm 120 can pivot about the pivot pin 124 with respect to the hinge mounting bracket 122 and the upper housing 102.

In embodiments, a receiving element 144 is mounted to the upper housing 122 around the access opening 106. The receiving element 144 can include a cutout 146 that is aligned with the access opening 106, the hinge extension 132, and the hinge 134 so that the support flange 130 and the hinge extension 132 of the swing arm 120 are at least partially received in the cutout 146 when the swing arm 120 is pivoted to the closed position (FIG. 2). The swing arm 120 is configured to have a compact length to enable the closure to be pivoted in a relatively short motion, while allowing a sufficient vertical travel/movement of the closure 108 to insert into and seal the pycnometric device 100. In the assembled configuration, the hinge 134 is located between two faces 148 (FIG. 3A) of the receiving element 144 along the cutout 146 so that the faces 148 at least partially retain the pivot pin 124 in the apertures 138. In one exemplary embodiment, the swing arm hinge mount 110 can have a hinge length (e.g., a distance between a center of the hinge 134 and a center/axis of the support cylinder 128) of about 2 in.-3 in. (e.g., approximately 2.94 in.), although other lengths also can be provided in view of a sample container size of the pycnometric device. For example, the hinge arm can have a length that can be varied in relation to a size of the sample chamber of the pycnometric device, such that the hinge arm can have a length that can vary between approximately 0.5 in.-1 in. to approximately 10 in. for sample chambers ranging from 0.01 cc to approximately 2000 cc. The swing arm hinge mount 110, the hinge 134, and/or the receiving element could be otherwise positioned, shaped, arranged, and/or configured without departing from the scope of the disclosure.

Figure 4A:
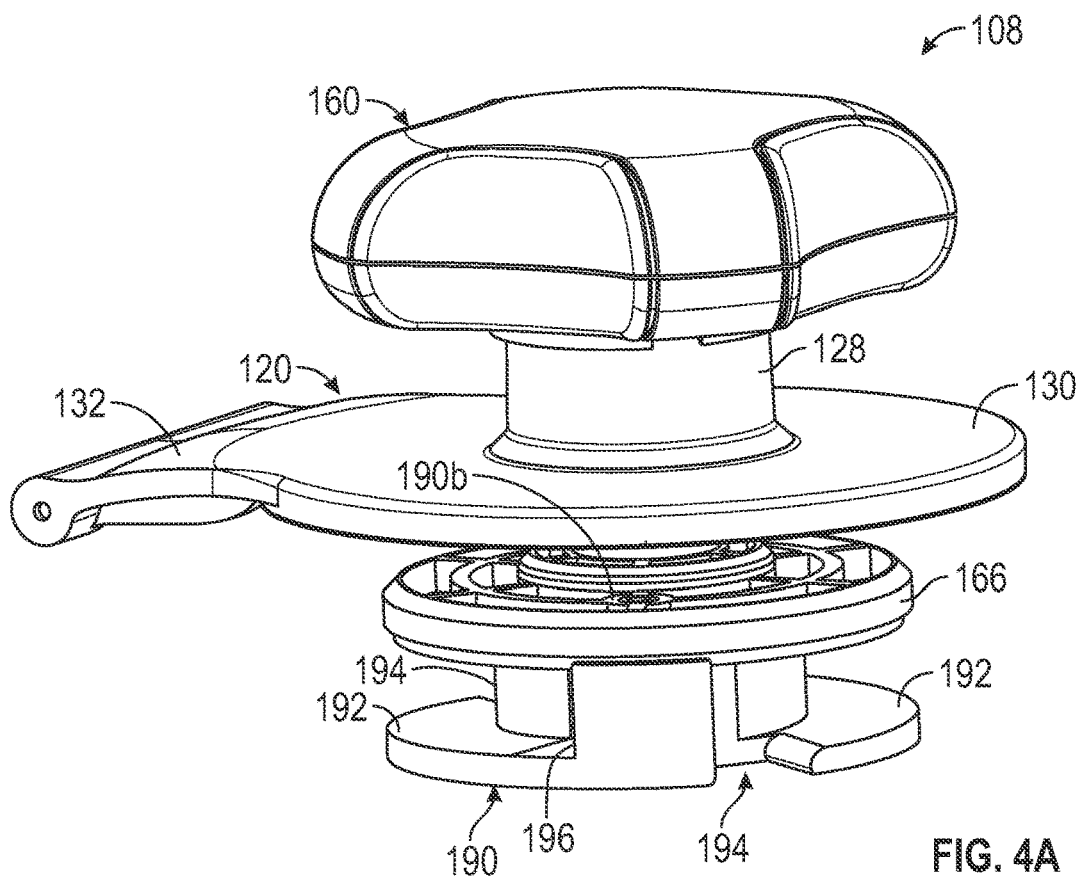
FIGS. 4A and 4B are schematic isometric views of a swing arm of the swing arm hinge mount of FIG. 3B engaging a closure of the pycnometric device of FIGS. 1 and 2.
Figure 4B:
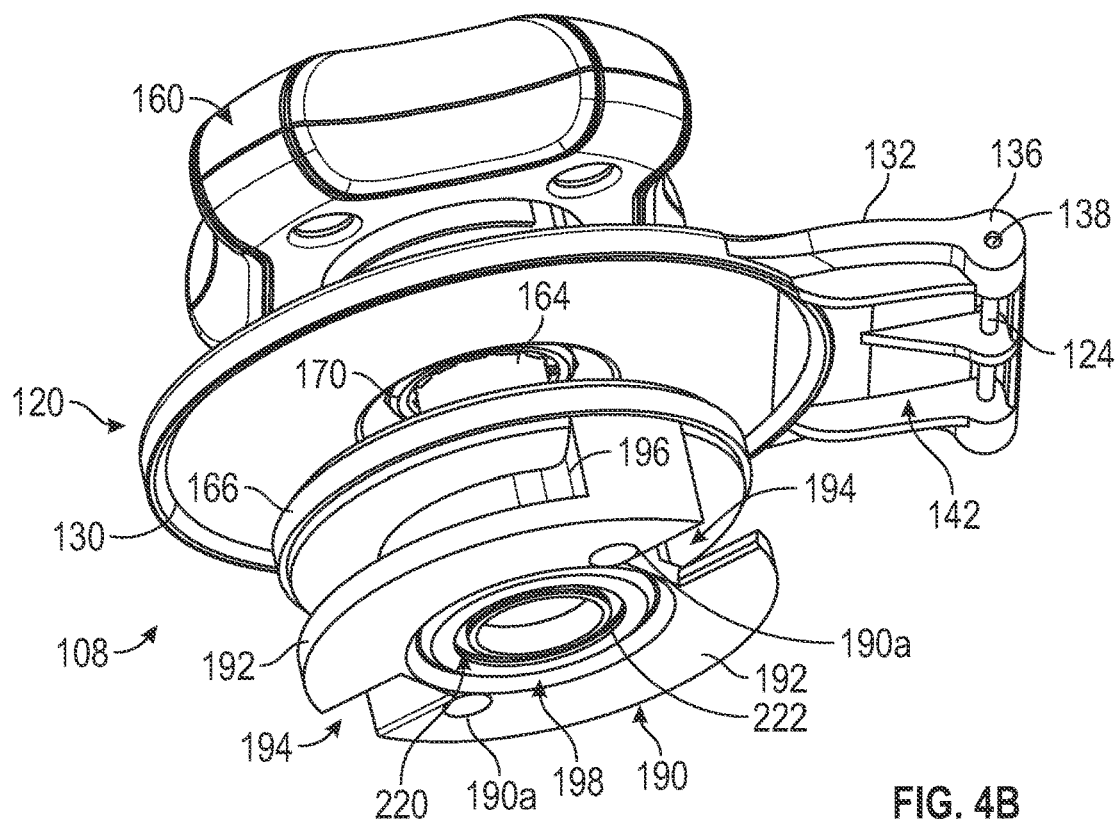
Figure 5:
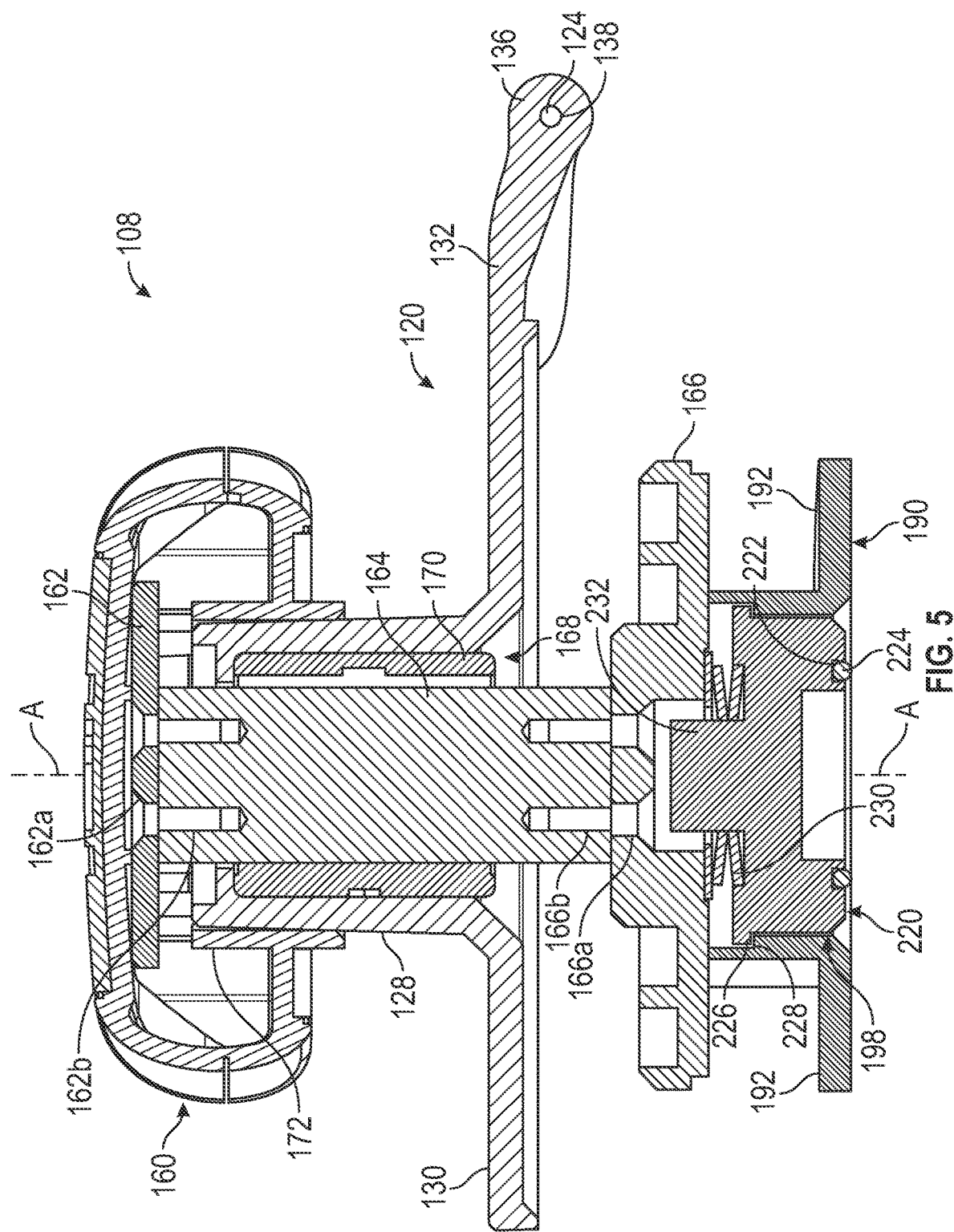
FIG. 5 is a schematic cross-sectional view of the closure of FIGS. 4A and 4B.

FIGS. 4A-5 show the closure 108 assembled with the swing arm 120. In the illustrated embodiment, the closure 108 can include a bayonet cap fitting with a knob or handle 160, an upper mounting plate 162 mounted to an interior of the handle 160 by suitable fasteners (not shown), a cap shaft or closure shaft 164 mounted to the upper mounting plate 162 by suitable fasteners (not shown) at a top end of the closure shaft 164, and a lower mounting plate 166 mounted to a bottom end of the closure shaft 164 by suitable fasteners (not shown). As shown in FIG. 5, the upper mounting plate 162 can include two or more holes 162a (for example, and without limitation, countersunk holes) that are aligned with respective bores 162b in the top end of the closure shaft 164 so that fasteners can be received through the holes 162a and bores 164a to secure the upper mounting plate 162 to the closure shaft 164. Similarly, the lower mounting plate 166 can include two or more holes 166a (for example, and without limitation, countersunk holes) that are aligned with respective bores 166b in the bottom end of the closure shaft 164 so that fasteners can be received through the holes 166a and bores 166b to secure the lower mounting plate 166 to the closure shaft 164.

As shown in FIG. 5, the closure shaft 164 can extend through a central opening 168 in the support cylinder 128 of the swing arm 120 with the upper mounting plate 162 located above the support cylinder 128 and the lower mounting plate 166 located below the support cylinder 128. In embodiments, one or both of the mounting plates 162, 166 can be secured to the closure shaft 164 after the closure shaft 164 is positioned within the support cylinder 128 so that the closure shaft 164 is captured in the support cylinder 128 between the mounting plates 162, 166. As shown in FIG. 5, a bearing 170 can be mounted to the interior of the central opening 168 between the support cylinder 128 and the closure shaft 164. The bearing 170 can be configured to allow the closure shaft 164 to rotate within the support cylinder 128 and to translate relative to the support cylinder 128 along an axis A of the support cylinder 128 (FIG. 5). In exemplary embodiments, the bearing 170 can be a linear slide bearing and can be any suitable variation of a bronze sleeve bearing (for example, and without limitation, oil embedded, PTFE embedded, graphite, and the like), any suitable type of sleeve bearing, or any other suitable bearing or bushing.

Further, as shown in FIG. 5, the handle 160 can include an inner guide wall 172 that is axially aligned with the closure shaft 164 and extends along an exterior surface of the support cylinder 128. In embodiments, the closure 108 can move axially relative to the swing arm 120 with the closure shaft 164 sliding along an interior of the bearing 170 and the inner guide wall 172 of the handle 160 sliding along an exterior surface of the support cylinder 128. In one exemplary embodiment, the closure 108 and the swing arm 120 can be configured so that the closure 108 can travel approximately a desired distance, such as, for example, and without limitation, about 0.67-inches (e.g., approximately 0.25 in. to approximately 0.70 in.) or any suitable distance.

Figure 6:
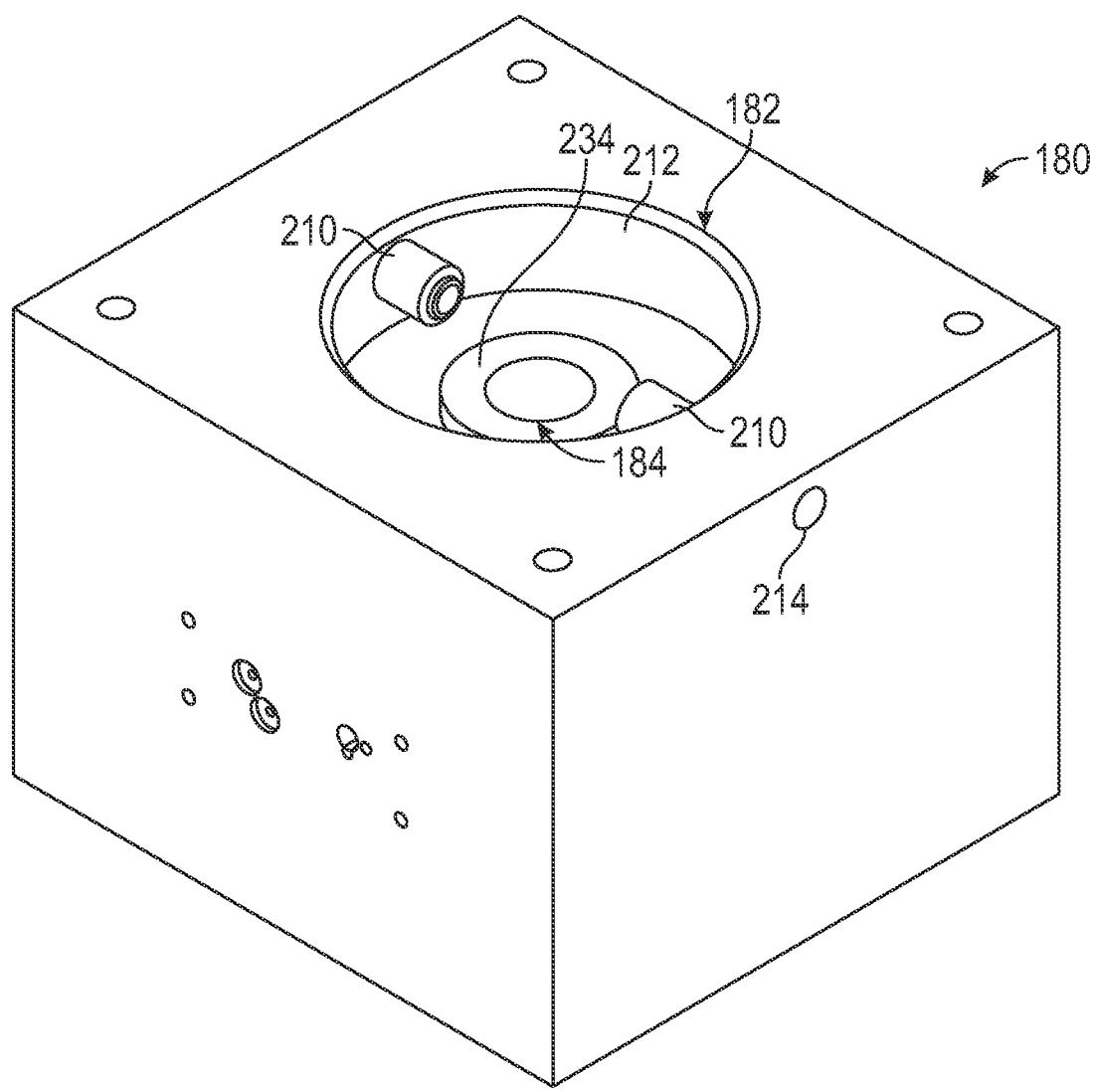
FIG. 6 is a schematic isometric view of a chamber block of the pycnometric device of FIGS. 1 and 2.
Figure 7A:
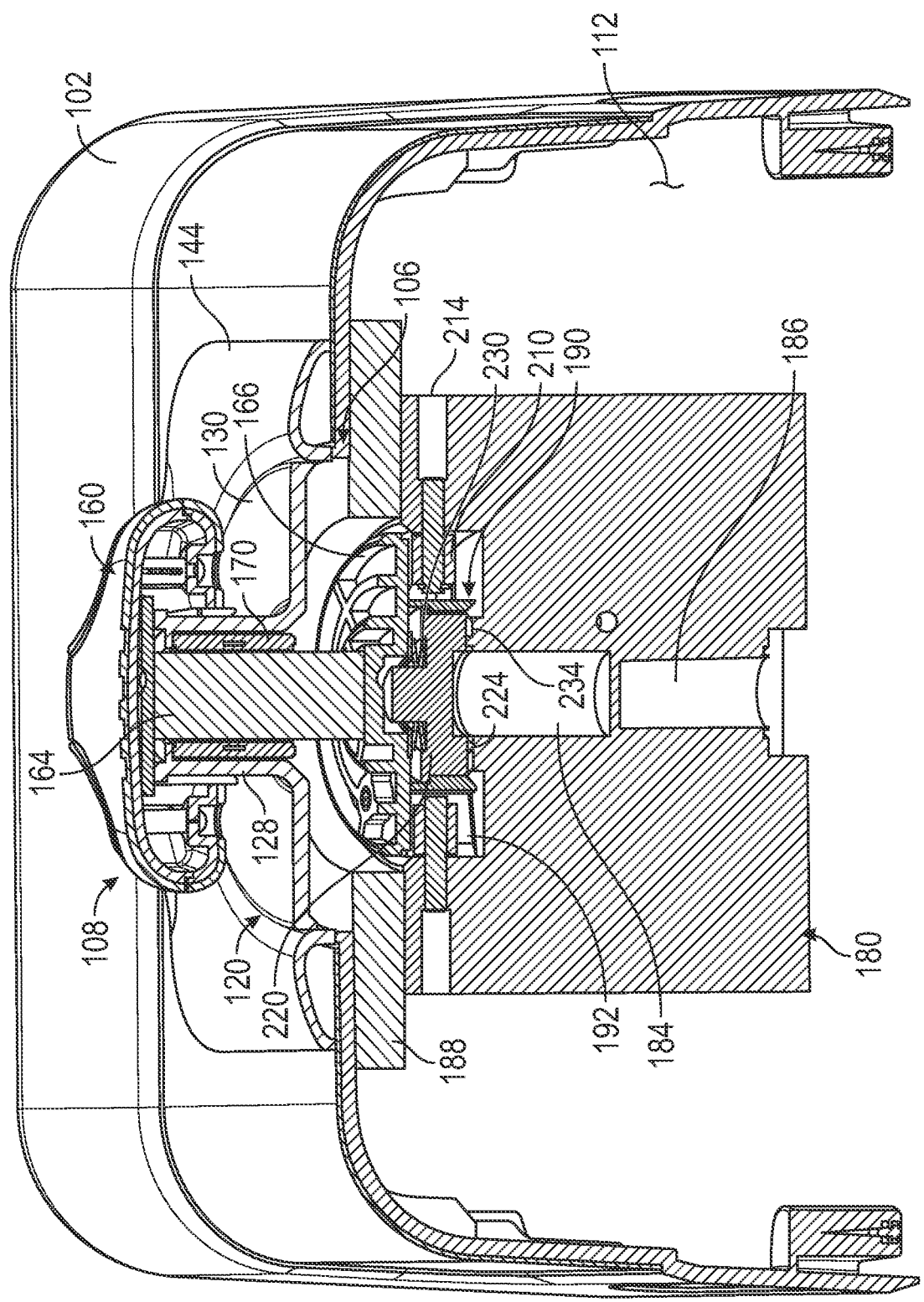
FIGS. 7A and 7B are schematic cross-sectional views of the pycnometric device of FIGS. 1 and 2.
Figure 7B:
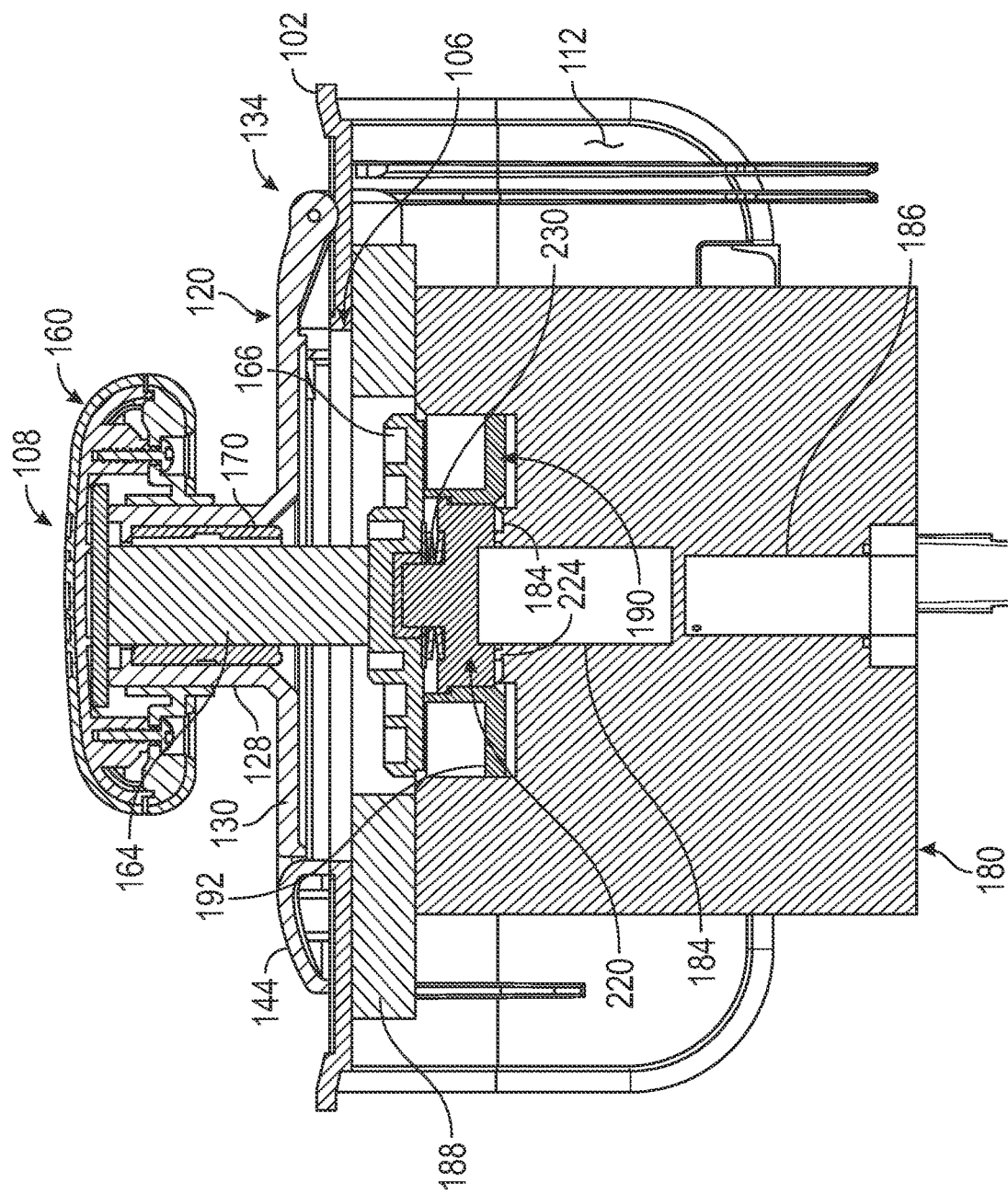

As shown in FIGS. 4A-5, the closure 108 can include locking features that cooperate with engagement features in a chamber block 180 located in the interior of the pycnometric device 100. For example, as shown in FIGS. 6-7B, the chamber block 180 can include a locking recess 182 extending around a sample chamber 184. In embodiments, the chamber block 180 also can at least partially define a reference chamber 186 (FIGS. 7A and 7B). As shown in FIGS. 1, 7A, and 7B, an insulation block 188 can be mounted between the upper housing 102 and the chamber block 180 and can include a cutout aligned with the locking recess 182 for providing clearance for the closure 108. In embodiments, the chamber block 180 can be aluminum or any other suitable material, and the insulation block 188 can be a closed cell foam or any other suitable material.

In the illustrated embodiment, the locking features of the closure 108 and the engagement features in the chamber block 180 are configured as a bayonet fitting, which, in exemplary embodiments, can have the advantages of being self-aligning, allowing a user to rapidly and precisely close and seal the device with one hand with less than a single turn of the closure 108, for example, and without limitation, rotation through approximately 120°-260°, and in embodiments, rotation through approximately 130°; or optionally, rotation through approximately ⅓-½ of a turn of the closure.

In particular, it is contemplated that the closure can include a spring-loaded or otherwise biased fitting configured to provide a substantially vertical motion to the locking and sealing feature of the closure to enable these features to be moved into a seated engagement within the access opening 106 once the closure has been pivoted to its closed position by the swing arm. A bayonet-type fitting also provides a repeatable and simple operation to move the closure 108 to a predefined location relative to the chamber block 180 without the need for aligning fiduciary marks. Accordingly, the bayonet fitting can help avoid overtightening of the sealing features (for example, and without limitation, an O-ring, gasket, or the like), which can lead to premature failure of the sealing features, and can help avoid under-tightening of the sealing features, which can lead to an improper seal. The consistent and proper compression of the sealing features provided by the bayonet style fitting can improve precision to pycnometry measurements by the pycnometric device 100, such as by reducing user errors during operation of the device. In alternative embodiments, the closure 108 can be releasably coupled to the chamber block 180 for sealing the sample chamber 184 by threaded engagement or any other suitable connection.

As shown in FIGS. 4A-5, the bayonet-style locking features of the closure 108 can include a cam plate 190 mounted to an underside of the lower mounting plate 166, opposite to the closure shaft 164. For example, the cam plate 190 can include two holes 190a (FIG. 4B) that are aligned with respective holes 190b (FIG. 4A) in the lower mounting plate 166 so that the cam plate 190 can be secured to the lower mounting plate 166 by suitable fasteners (not shown) via the holes 190a, 190b. As shown in FIGS. 4A and 4B, the cam plate 190 can include two spaced ramps 192 extending along an exterior of the cam plate 190, each of the ramps 192 extending from a respective cutout 194 to a respective stop feature 196. The ramps 192 can be tapered so that the ramps are narrower at the cutout 194 and gradually get thicker toward the stop feature 196. As shown in FIGS. 4B and 5, the cam plate 190 can extend around an axial bore 198 for receiving sealing features of the closure 108 as described in more detail below.

As shown in FIGS. 6 and 7A, the chamber block 180 can include two cam followers 210 mounted opposite to one another on an interior wall 212 of the locking recess 182. For example, each of the cam followers 210 can include a needle bearing or other suitable bearing or bushing mounted on a respective bearing pin secured in a respective hole 214 of the chamber block 180. In embodiments, the cam followers can be sized to fit through the cutouts 194 in the cam plate 190 as the cam plate 190 is inserted into the locking recess 182. The cam followers 210 can move along (e.g., roll along) the tapered cam surfaces of the respective ramps 192 as the cam plate 190 is rotated about its axis in the locking recess 182. In an exemplary embodiment, the stop features 196 of the ramps 194 can be recessed and/or angled with respect to the remainder of the cam surface of the ramps 194, or otherwise shaped to help hold the respective cam followers 210 in place when the cam followers 210 engage the respective stop features 196. Accordingly, the ramps 194 and the stop features 196 can cooperate with the cam followers 210 to releasably lock the closure 108 in a closed and sealed position with respect to the chamber block 180.

As shown in FIGS. 4B and 5, the sealing features of the closure 108 can include a chamber sealing cap 220 at least partially located in the axial bore 198 of the cam plate 190. In embodiments, the chamber sealing cap 220 can include a groove 222 in its bottom face, wherein the groove retains an O-ring 224 (or gasket or other suitable sealing feature). As shown in FIG. 5, the chamber sealing cap 220 can include a flange 226 extending outwardly from the chamber sealing cap 220, and the axial bore 198 can have a shoulder 228 extending below the flange 226 so that the chamber sealing cap 220 is captured between the shoulder 228 and the lower mounting plate 166. A spring 230 or other suitable biasing member can be positioned around an axial projection 232 of the chamber sealing cap 220. As shown in FIG. 5, the spring 230 can be captured between the lower mounting plate 166 and the chamber sealing cap 220 and can be configured to bias the chamber sealing cap 220 downwardly, in a substantially vertical movement, away from the lower mounting plate 166 so that the flange 226 is biased toward the shoulder 228. As shown in FIGS. 6-7B, the chamber block 180 can include a seal surface 234 extending between the sample chamber 184 and the locking recess 182. Accordingly, the spring 230 can bias the chamber sealing cap 220 downwardly toward the seal surface 234 so that the O-ring 224 is compressed between the chamber sealing cap 220 and the seal surface 234 to seal the sample chamber 184 when the closure 108 is in the closed configuration.

Figure 8:
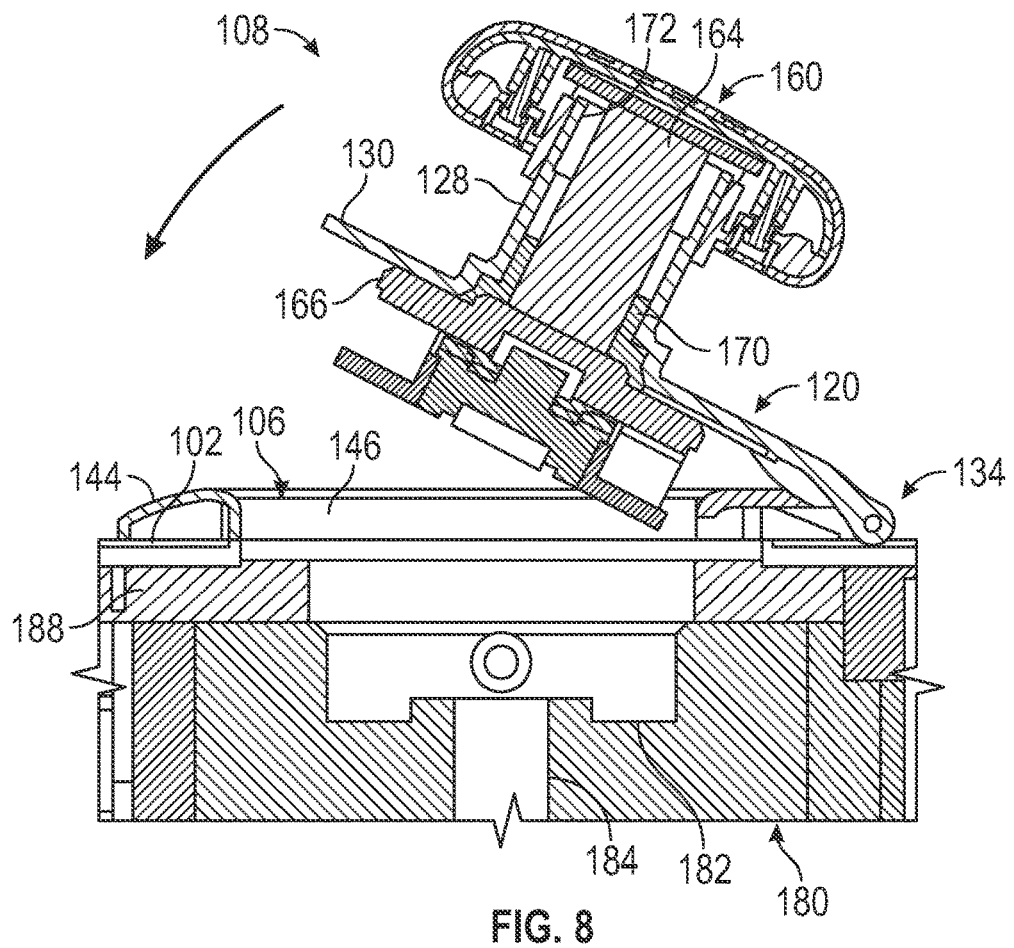
FIG. 8 is a schematic cross-sectional view of the pycnometric device of FIGS. 1 and 2 showing a closing operation of the closure of FIGS. 4A and 4B according to embodiments of the present disclosure.

In operation, the closure 108 can be moved from the open configuration of FIG. 1 to the closed and sealed configuration (e.g., FIGS. 2, 7A, and 7B), such as after loading a sample (not shown) into the sample chamber 184, by pivoting the swing arm 120 with the closure 108 about the hinge 134 toward the access opening 106 (FIG. 8). As shown in FIG. 8, the closure 108 can be retracted relative to the swing arm 120 with the lower mounting plate 166 positioned against an underside of the flange 130 and the handle 160 moved away from the flange 130. The retracted position of the closure 108 can provide clearance between the closure 108 and the chamber block 180 and/or other features in and around the access opening 106 as portions of the closure 108 are moved into the access opening 106. Once the swing arm 120 is rotated to move the closure toward its closed position, at least partially received in the cutout 146 of the receiving element 144, the closure 108 can be urged downwardly into the opening 106 and rotated until the cutouts 194 of the cam plate 190 are aligned with the cam followers 210 in the locking recess 182 and the closure 108 can be moved from the retracted position to an inserted position in which the cam followers 210 are at least partially received in the cutouts 194 adjacent the respective ramps 192.

Figure 9:
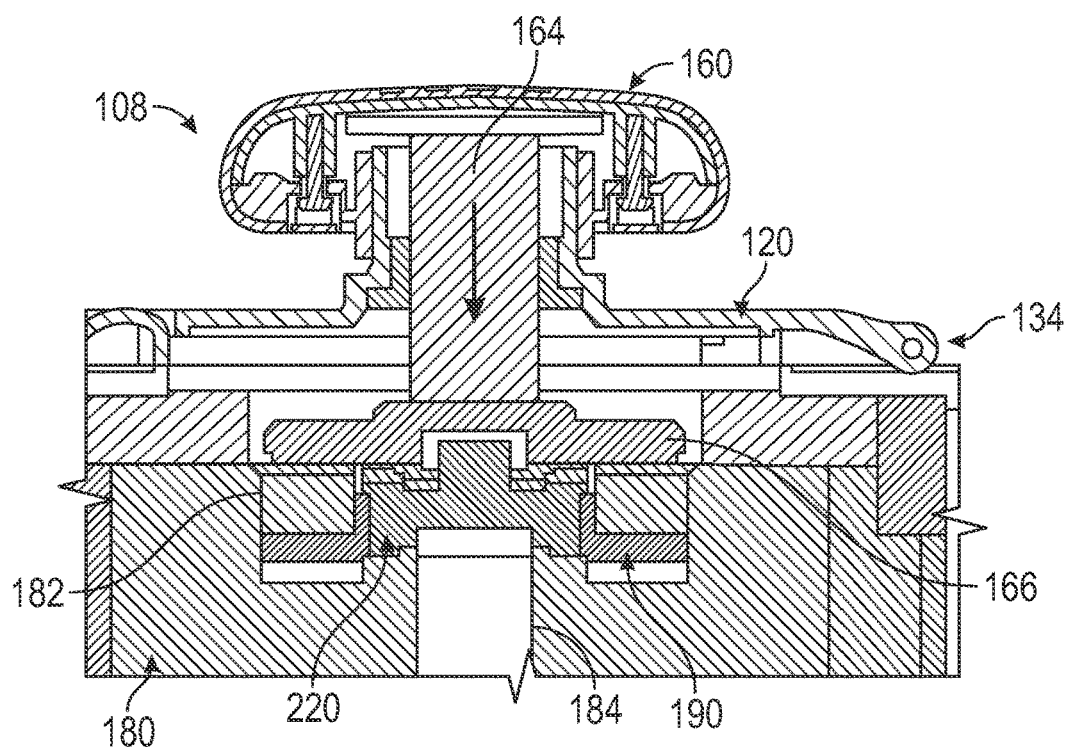
FIG. 9 is a schematic view of the closure of FIGS. 4A and 4B moved into an inserted, sealed position within a chamber of the pycnometric device of FIGS. 1 and 2 according to embodiments of the present disclosure.

In embodiments, as the closure is moved from the retracted position to the inserted position (e.g., as schematically shown in FIGS. 8 and 9), the closure shaft 164 can slide along the bearing 170 and the inner guide wall 172 of the handle 160 slides along the support cylinder 128. The closure is thus enabled to move in a substantially smooth motion, moving in a vertical direction while substantially ensuring that the closure is presented to the access opening of the closure block along a horizontal sealing plane. Such motion further is accomplished as a one-step movement, without necessarily requiring multiple steps or actions to move the closure along a generally arcuate path of travel and enabling the substantially vertical presentation and insertion of the closure to the access opening.

In an exemplary embodiment, a user can then turn the handle 160 to rotate the closure 108, with the closure shaft 164 rotating past the interior of the bearing 170. As the closure 108 turns, the ramps 192 of the cam plate 190 move toward and engage the cam followers 210 so that the cam followers move (e.g., roll) along the cam surfaces of the ramps 192 until the cam followers 210 engage the stop features 196. When the cam followers 210 engage the stop features 196 (e.g., the recessed and/or angled stop features and/or a stop wall of the cam plate 190), rotation of the closure 108 becomes more difficult or impossible, providing feedback to the user that the proper stopping point has been reached. In operation, as the ramps 192 move relative to the cam followers 210, that the cam plate 190 is pressed downwardly toward the chamber block 180 (e.g., the cam surfaces of the ramps 192 gradually move closer to the lower mounting plate 166 as the ramps 192 get thicker closer to the stop features 196). One will appreciate that, since the cam plate 190 is coupled to the lower mounting plate 166, the downward pressure on the cam plate 190 by the cam followers 210 in the chamber block 180 causes the lower mounting plate 166 (and the rest of the closure 108) to move downwardly toward the chamber block 180. This downward movement of the lower mounting plate 166 applies downward pressure on the chamber sealing cap 220 via the spring 230 so that the chamber sealing cap 220 presses the O-ring 224 against the sealing surface 234 of the chamber block 180 with an appropriate amount of pressure for sealing the sample chamber 184. In embodiments, the engagement of the cam followers 210 with the stop features 196 can help retain the closure 108 in the closed position.

The closure 108 can be moved to the open position by turning the handle 160 in the opposite direction to disengage the cam followers 210 from the stop features 196 and rotating the closure 108 until the cam followers 210 are aligned with the cutouts 194 in the cam plate 190. Thereafter, the closure 108 can be moved axially with respect to the support cylinder 128 and the bearing 170 from the inserted position to the retracted position (e.g., moving from an inserted position as shown in FIG. 9 to a retracted, opened position pivoted outwardly and away from the sample chamber as shown in FIG. 8). Once the closure 108 is in the retracted position, the closure 108 and the swing arm 120 can be pivoted upwardly away from the access opening 106 (FIGS. 1 and 8).

In embodiments, advantages of the present disclosure include that the swing arm hinge mount 110 can hold the closure 108 when in the open configuration, freeing up a user's hands and helping to avoid contamination of the O-ring 124 during loading and/or unloading of the sample chamber 184. In exemplary embodiments, the linear motion of the closure 108 within the swing arm hinge mount 110 (e.g., the axial movement of the closure shaft 164 within the support cylinder 128) allowed by the bearing 170 once the swing arm 120 is in place in the closed position facilitates the efficient closing of the pycnometric device 100. For example, the closure 108 can be a bayonet-style closure that is pivoted about the hinge 134 with the swing arm 120 with the closure 108 in the retracted position so that the features of the closure 108 are positioned out of the way until the swing arm 120 is moved to its closed position. Another advantage is that the support cylinder 128 of the swing arm 120 holds the closure 108 in position (e.g., oriented vertically and aligned with the locking recess 182 and the seal surface 234 of the chamber block 180) during closing and sealing and/or opening of the closure. This can help avoid errors and wear on parts that can be caused by a user that may insert the closure at the wrong angle, for example, if the closure was not supported and guided by the swing arm 120.

Figure 10A:
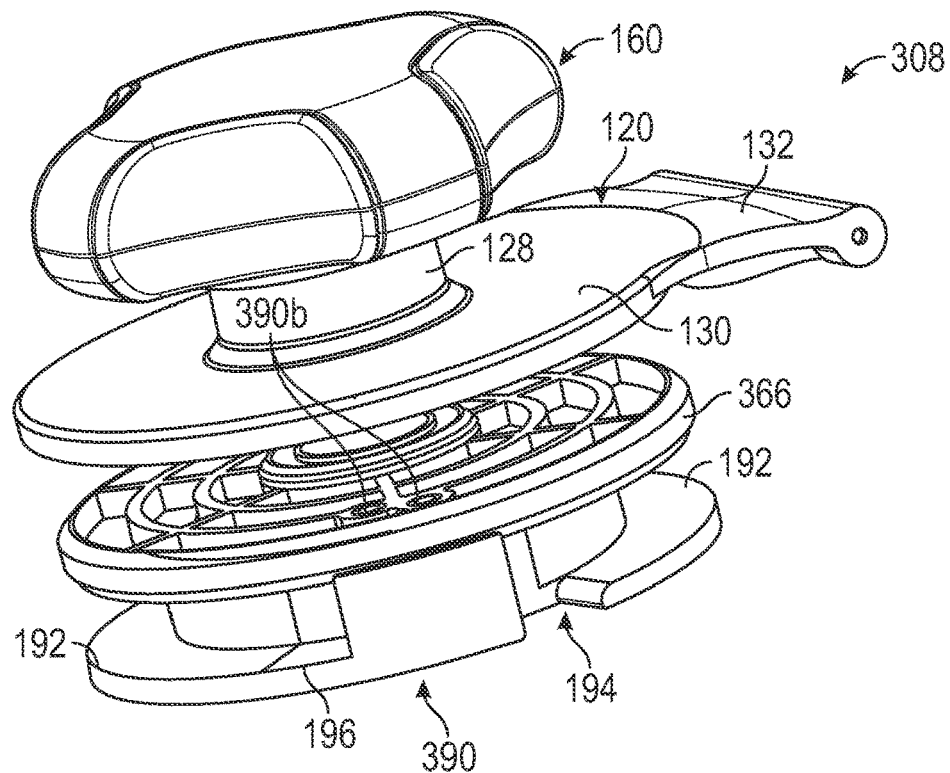
FIGS. 10A and 10B are schematic isometric views of a closure according to alternative embodiments of the disclosure.
Figure 10B:
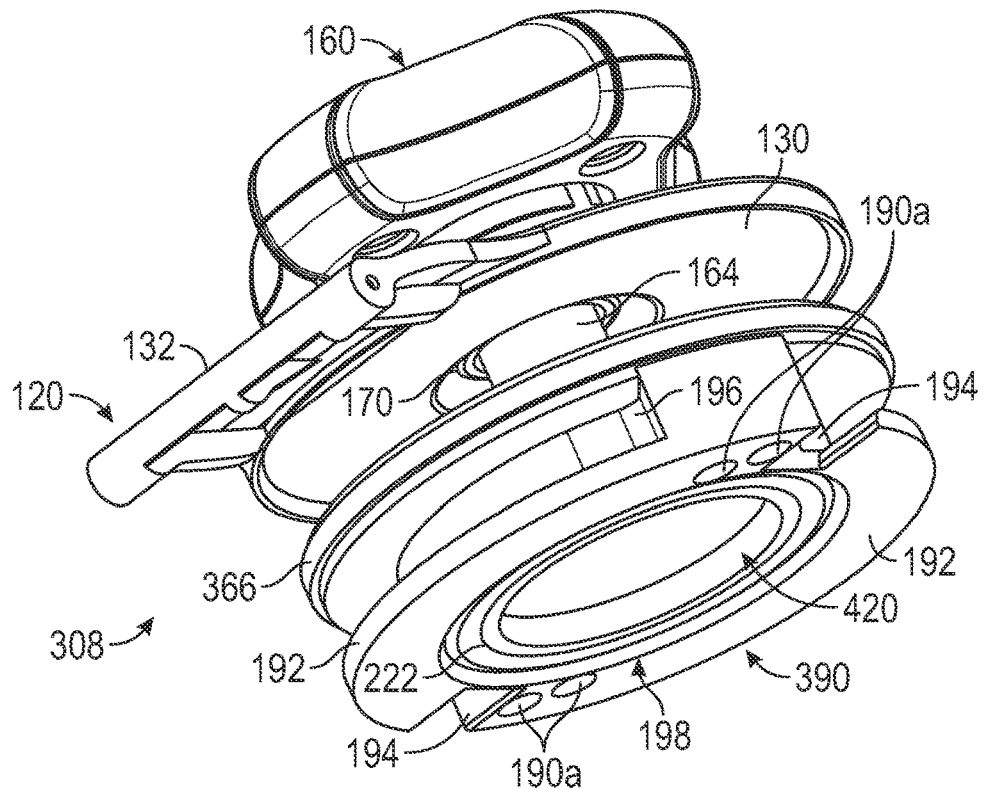
Figure 11:
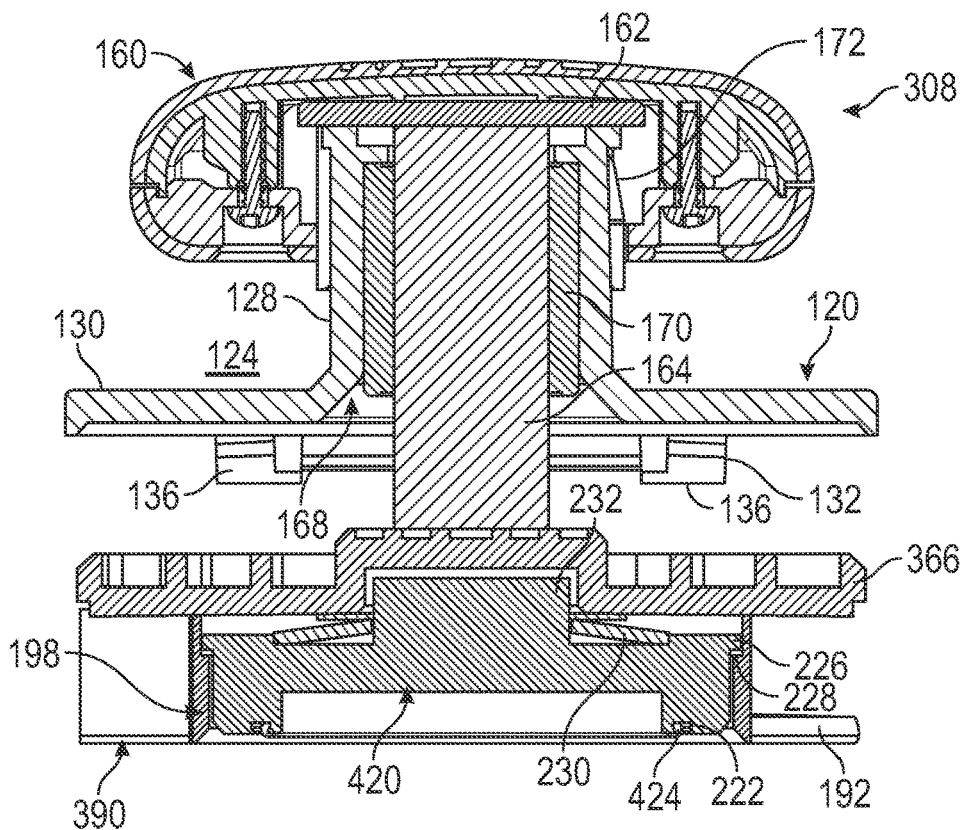
FIG. 11 is a schematic cross-sectional view of the closure of FIGS. 10A and 10B.

FIGS. 10A-11 show a closure 308 for a pycnometric device according to another embodiment of the disclosure, which embodiment is generally similar to the prior embodiments except for variations noted and variations that will be apparent to one of ordinary skill in the art. Accordingly, similar or identical features of the embodiments have been given like or similar reference numbers. As shown in FIGS. 10A-11, the closure 308 can have locking and/or sealing features for a pycnometric device with an alternatively scaled or dimensioned sample chamber 384 (e.g., larger; see FIGS. 12-13B). For example, and without limitation, the sample chamber 184 of the prior embodiments (FIGS. 6-7B) may have a volume of about 10 cubic centimeters (e.g., approximately 10 cc) and the sample chamber 384 of FIGS. 12-13B can have a volume of about 100 cubic centimeters (e.g., approximately 100 cc). It is contemplated that other size sample chambers also can be used, such as, for example and without limitation, sample chambers having a volume ranging from approximately 0.01 cc to approximately 2000 cc.

Figure 12:
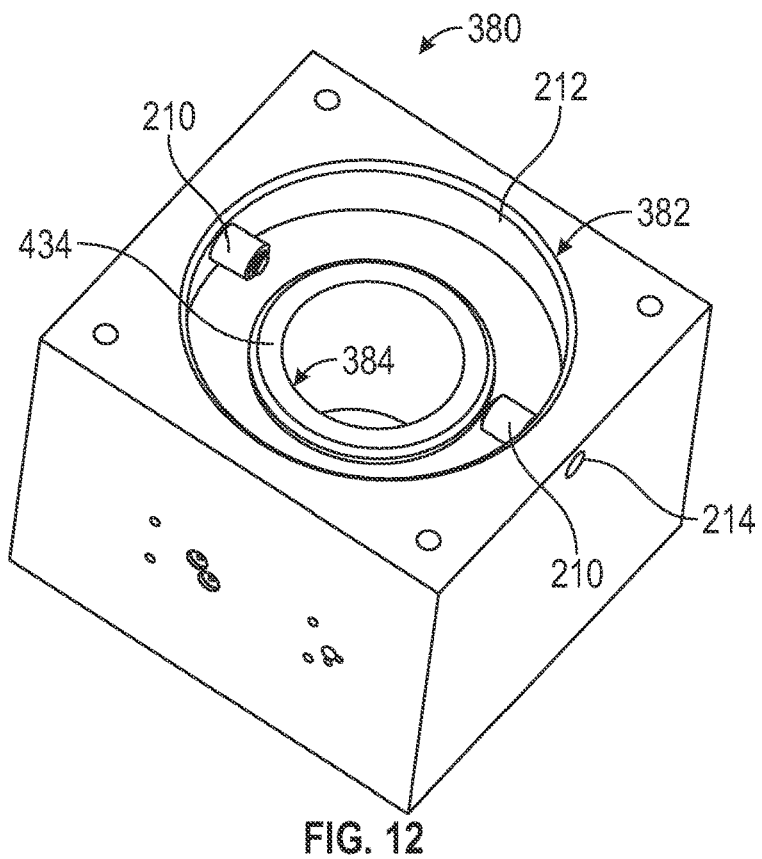
FIG. 12 is a schematic isometric view of a chamber block according to alternative embodiments of the disclosure.
Figure 13A:
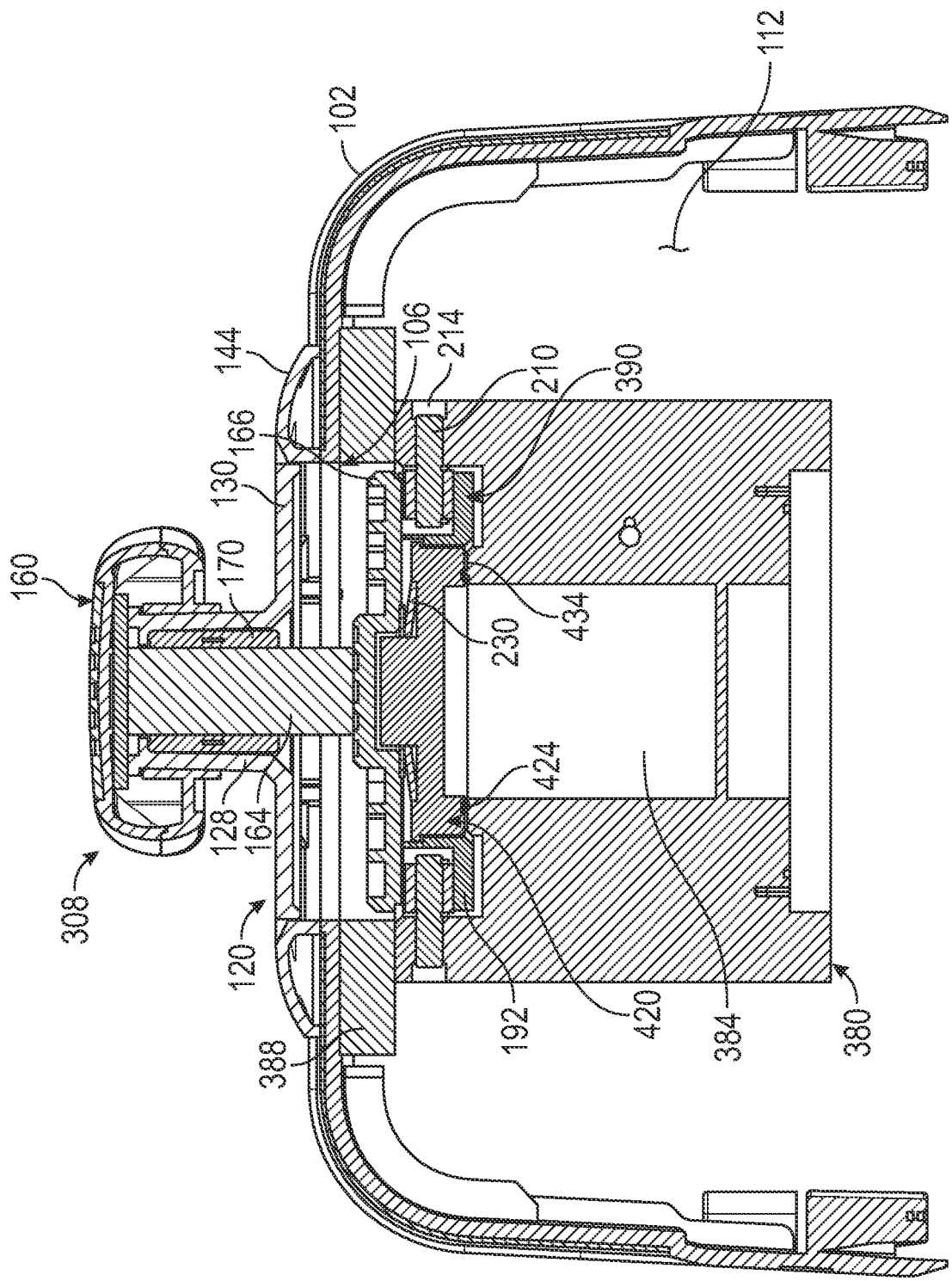
FIGS. 13A and 13B are schematic cross-sectional views of the closure of FIGS. 10A and 10B and the chamber block of FIG. 12 assembled in a pycnometric device according to alternative embodiments of the disclosure.
Figure 13B:
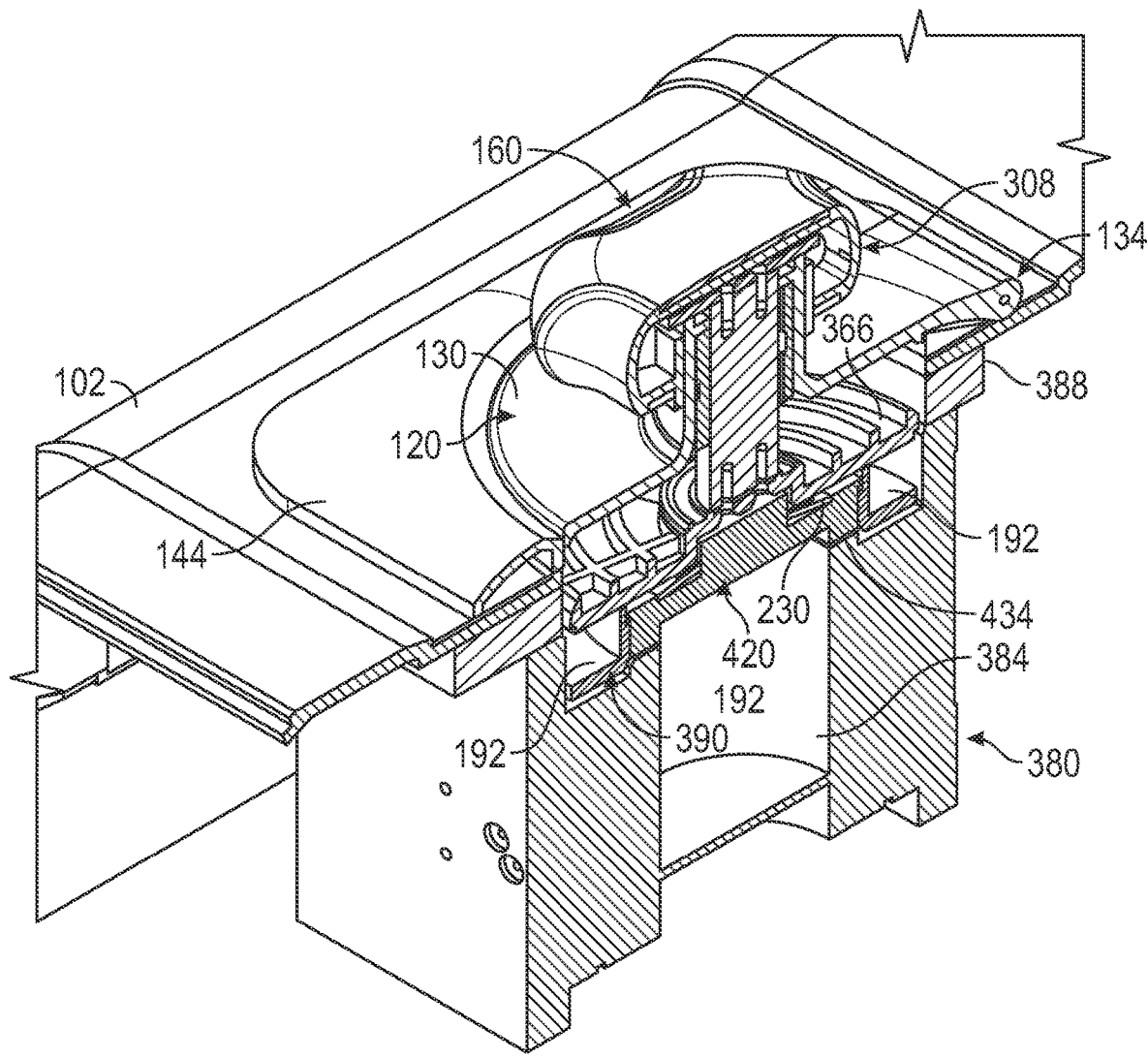

As shown in FIG. 12, the chamber block 380 can have a seal surface 434 with a larger diameter extending around the larger sample chamber 384, and the locking recess 382 of the chamber block 380 can be larger to accommodate the larger seal surface 434 and sample chamber 384. In embodiments, the lower mounting plate 366, the cam plate 390, and the chamber sealing cap 420 can be proportionally larger relative to the closure shaft 164 and the handle 160 of the closure 308 and the swing arm 130 than the lower mounting plate 166, the cam plate 190, and the chamber sealing cap 220 of the prior embodiments. Accordingly, the cam plate 390 is sized to cooperate with the larger locking recess 382 and the chamber sealing cap 420 is sized to hold a larger O-ring 424 that engages and forms a seal with the seal surface 434 when the closure 308 is in the closed and sealed position (FIGS. 13A and 13B).

As shown in FIGS. 10A and 10B, the cam plate 390 can include four holes 390a that are aligned with respective holes 390b in the lower mounting plate 366 so that the cam plate 390 can be secured to the lower mounting plate 366 by suitable fasteners (not shown) via the holes 390a, 390b. In embodiments, the plurality of fasteners can provide a more secure coupling between the lower mounting plate 366 and the larger cam plate 390. As shown in FIGS. 13A and 13B, the insulation block 388 can have a larger cutout than the insulation block 188 of prior embodiments in order to accommodate the cam plate 390 and the lower mounting plate 366 during opening and closing of the closure 308. In embodiments, the closure 308 can be moved from the open configuration to the closed and sealed configuration and can be unsealed and opened in a similar or identical manner as the closure 108 of the prior embodiments.

Figure 14A:
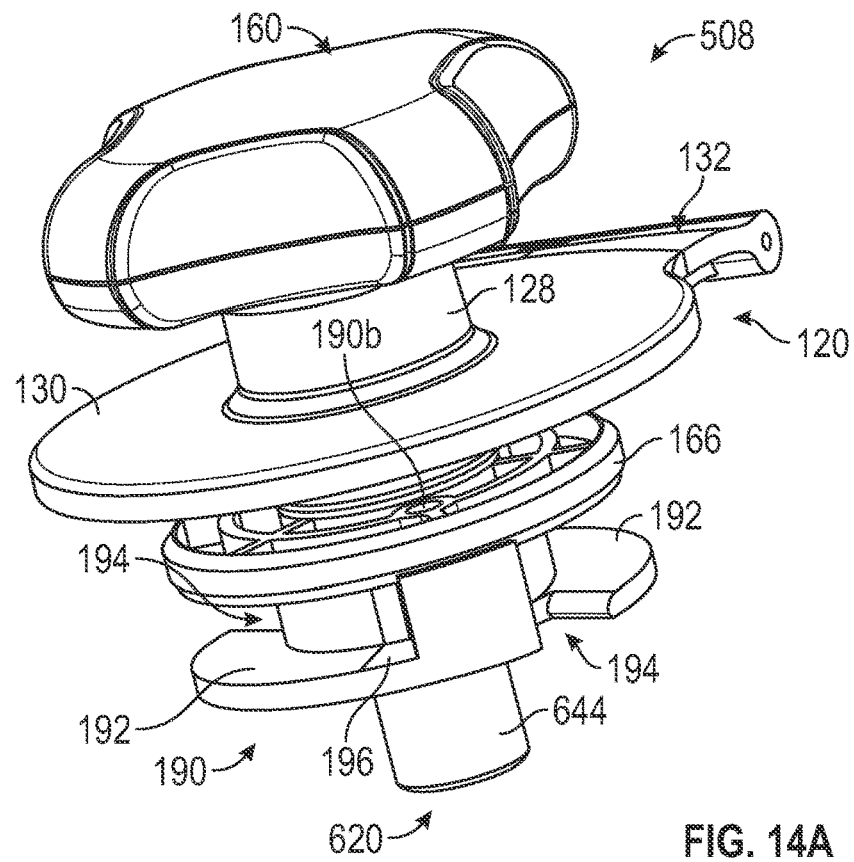
FIGS. 14A and 14B are schematic isometric views of a closure according to further alternative embodiments of the disclosure.
Figure 14B:
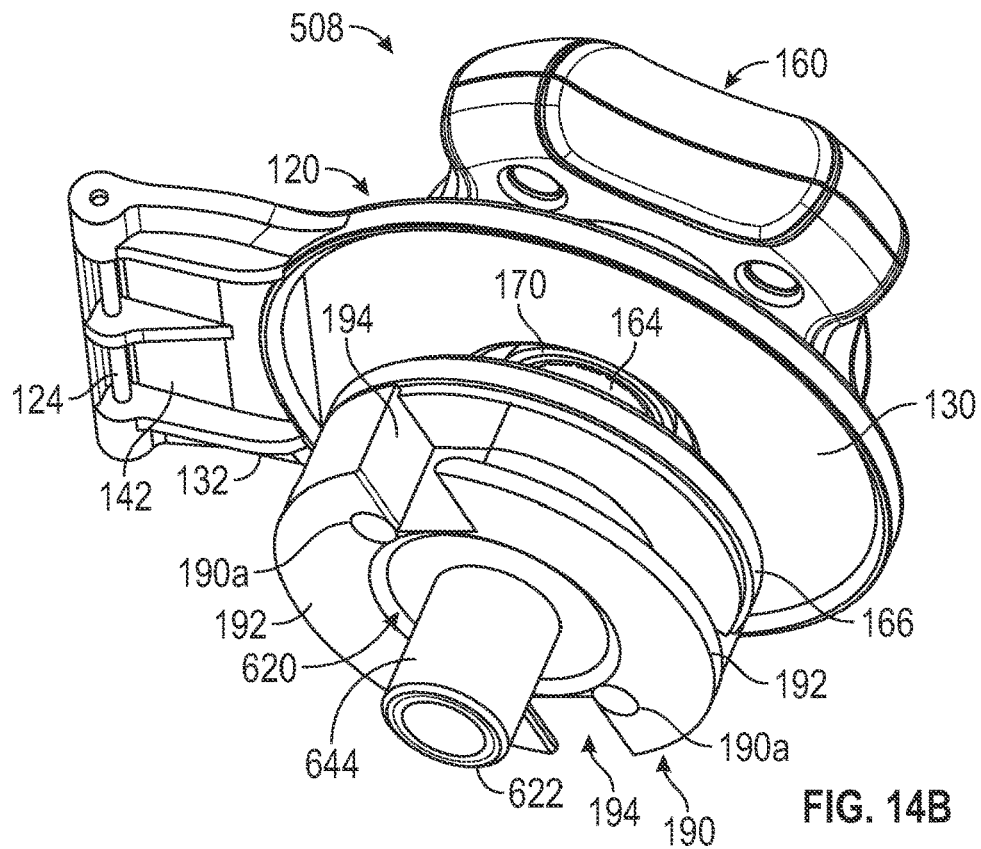
Figure 15:
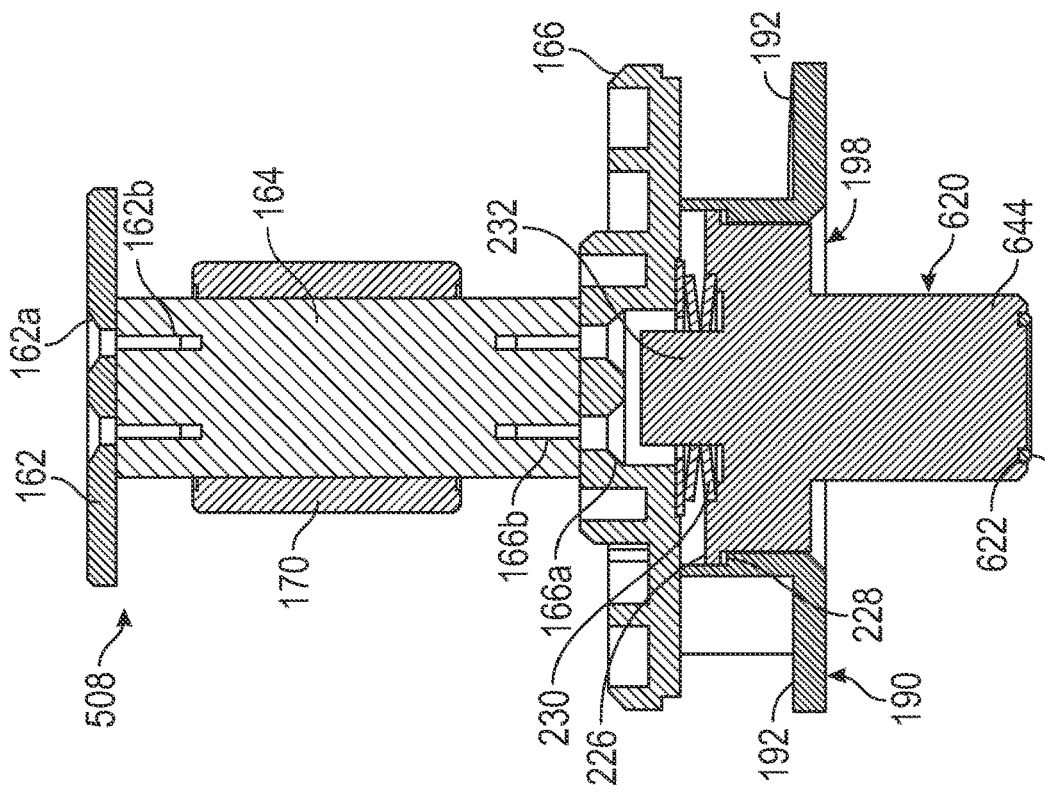
FIG. 15 is a schematic cross-sectional view of the closure of FIGS. 14A and 14B.

FIGS. 14A-15 show a closure 508 for a pycnometric device according to another embodiment of the disclosure, which embodiment is generally similar to the prior embodiments except for variations noted and variations that will be apparent to one of ordinary skill in the art. Accordingly, similar or identical features of the embodiments have been given like or similar reference numbers. As shown in FIGS. 14A-15, the closure 508 can have locking and/or sealing features for a pycnometric device with an alternative scaled or dimensioned sample chamber 584 (e.g., smaller; see FIGS. 18A and 18B) mounted to a chamber block 580 (FIGS. 16-18B). For example and without limitation, the sample chamber 184 of FIGS. 6-7B may have a volume of about 10 cubic centimeters (e.g., approximately 10 cc), the sample chamber 384 of FIGS. 12-13B can have a volume of about 100 cubic centimeters (e.g., approximately 100 cc), and the sample chamber mounted to the chamber block 580 of FIGS. 16-18B can have a volume of about 1 cubic centimeter (e.g., approximately 1 cc). Other size sample chambers also can be used, such as, for example and without limitation, sample chambers having a volume ranging from approximately 0.01 cc to approximately 2000 cc.

Figure 16:
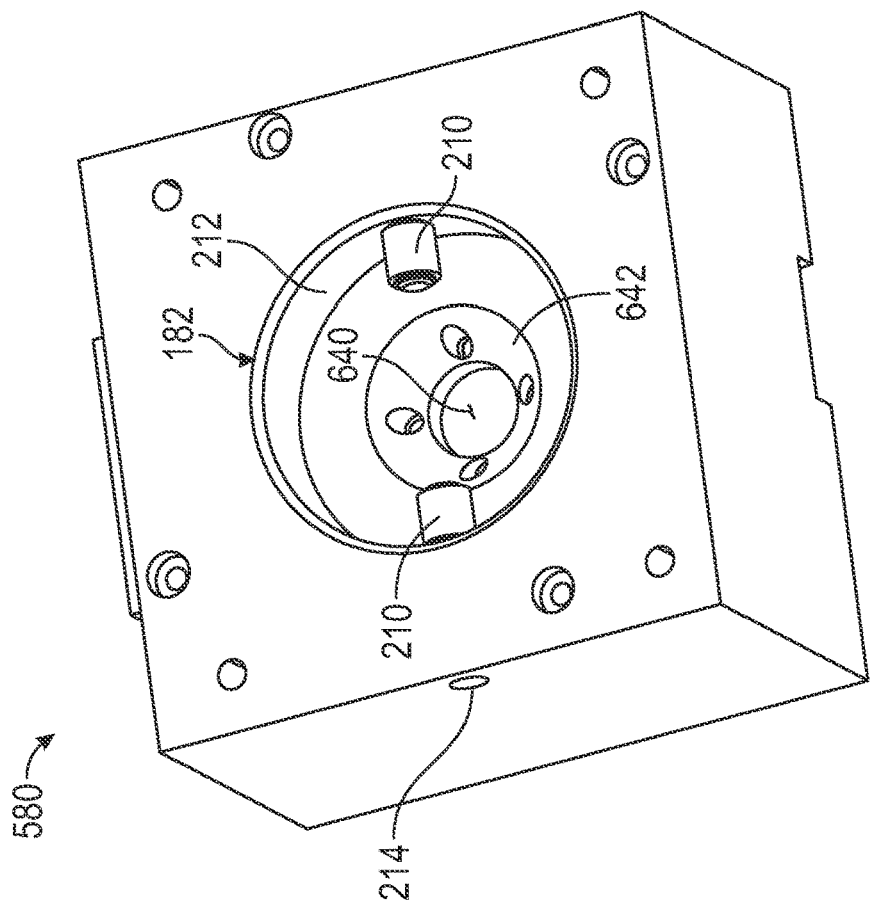
FIG. 16 is a schematic isometric view of a chamber block according to further alternative embodiments of the disclosure.
Figure 17A:
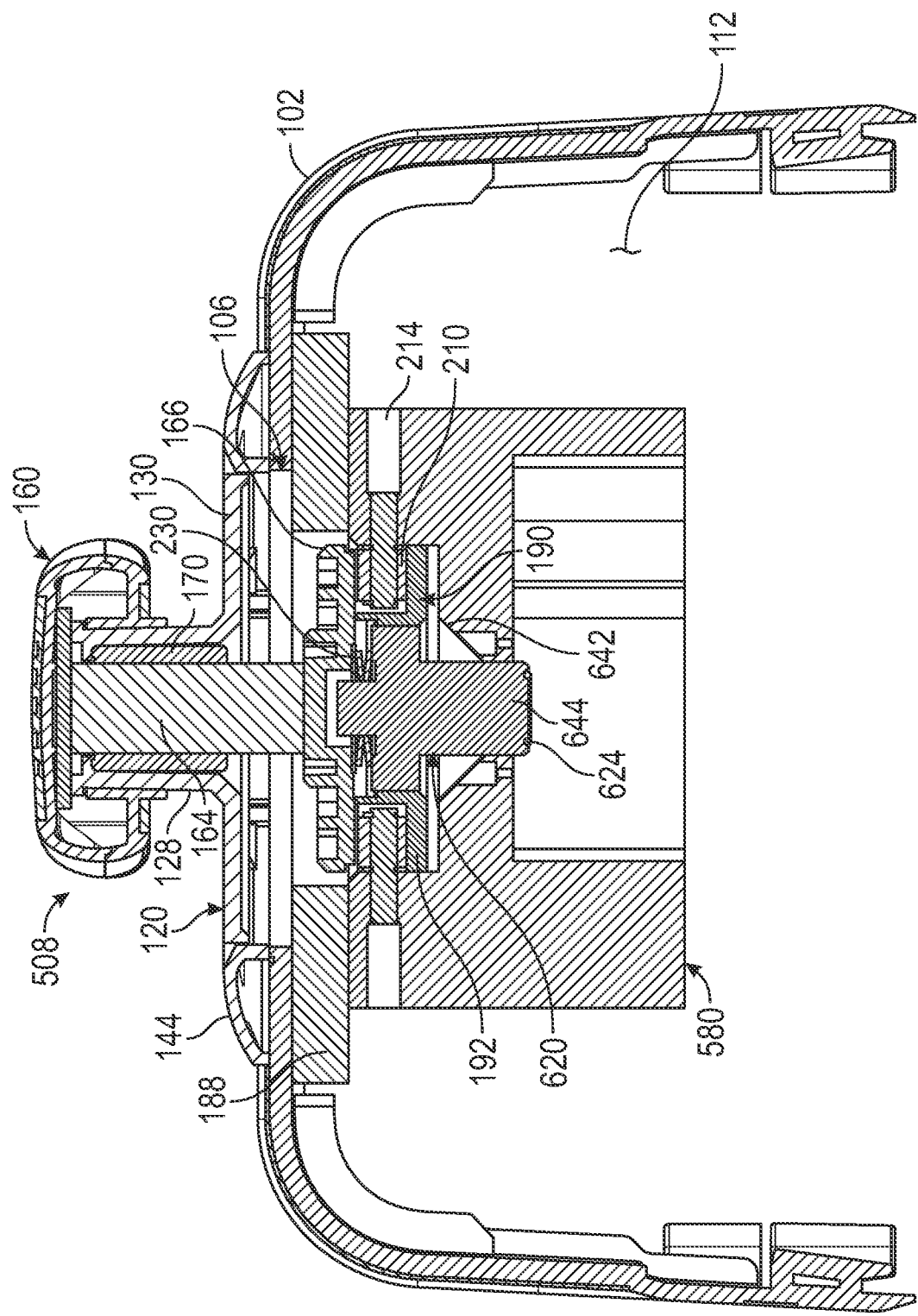
FIGS. 17A and 17B are schematic cross-sectional views of the closure of FIGS. 14A and 14B and the chamber block of FIG. 16 assembled in a pycnometric device according to further alternative embodiments of the disclosure.
Figure 17B:
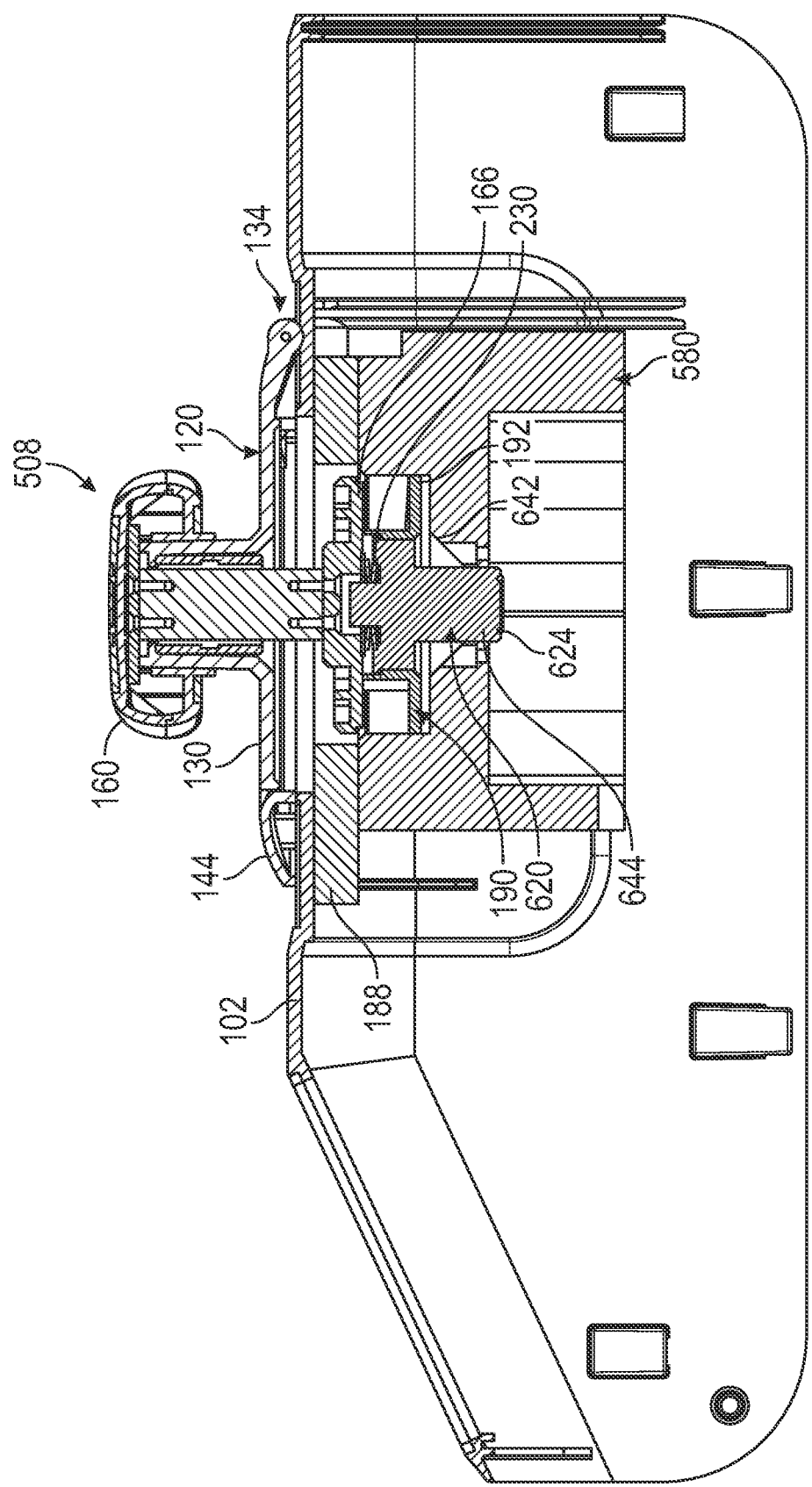
Figure 18A:
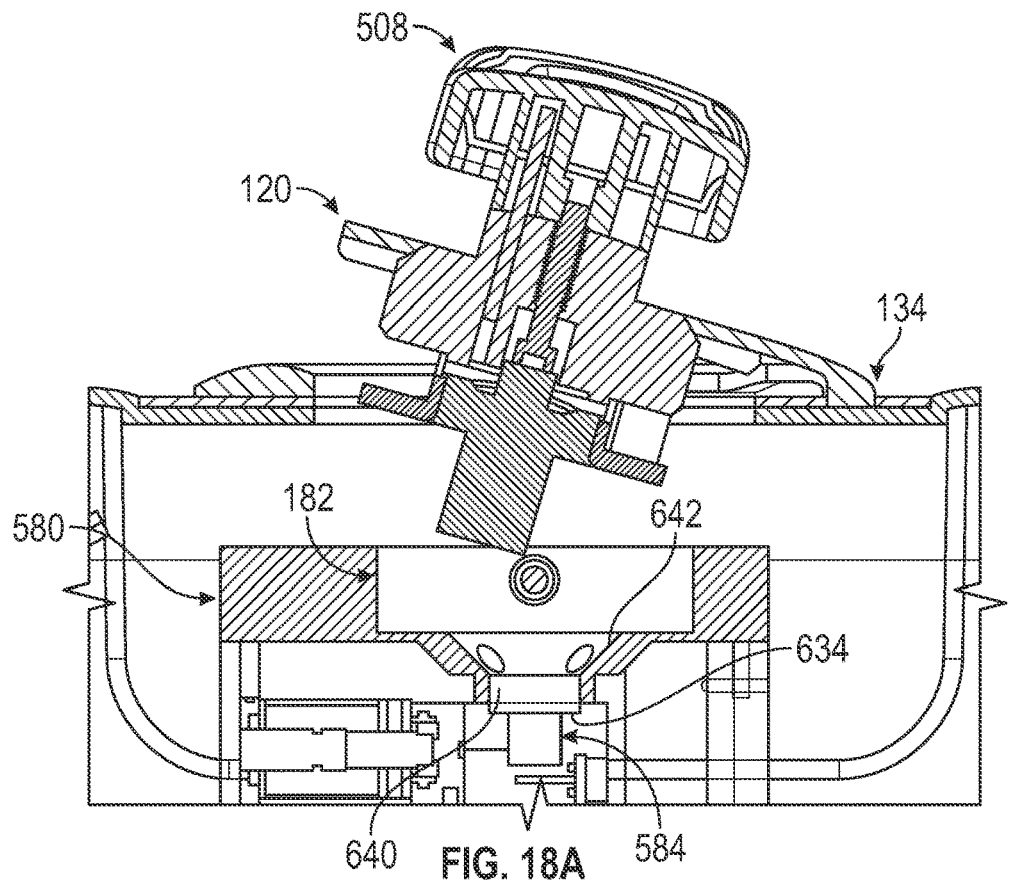
FIGS. 18A and 18B are schematic cross-sectional views of the closure of FIGS. 14A and 14B being moved relative to the chamber block of FIG. 16 according to further embodiments of the disclosure.
Figure 18B:
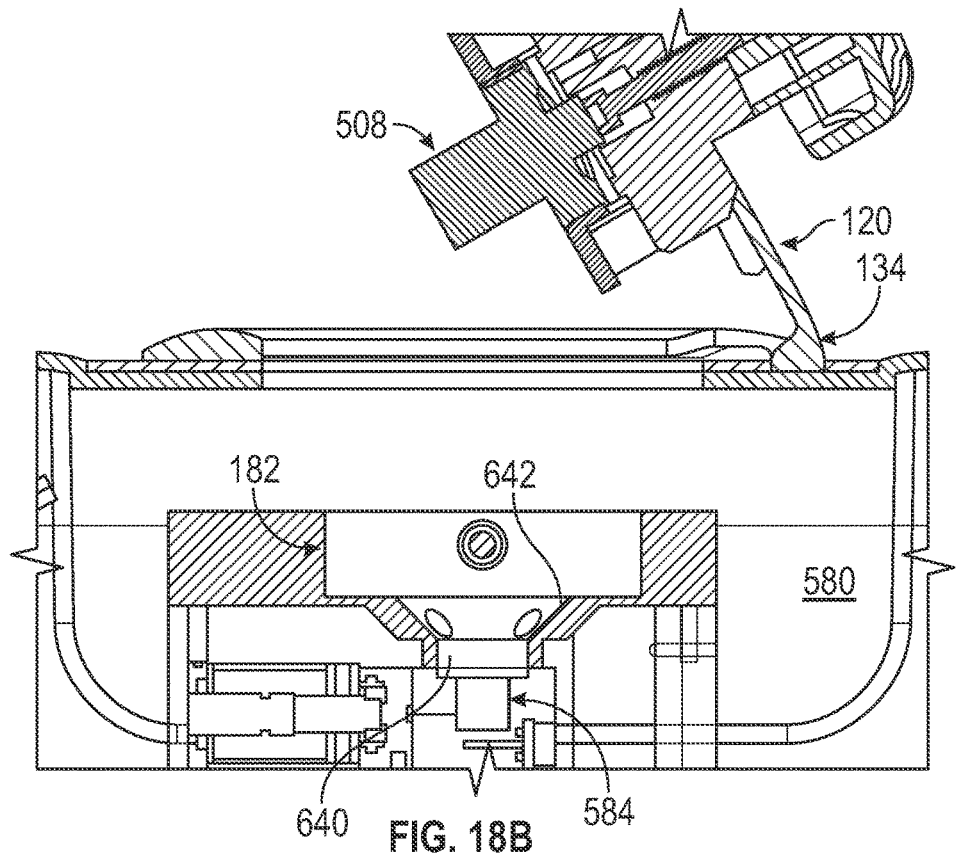

As shown in FIGS. 16-17B, the chamber block 580 can include a central bore 640 and a sloped surface 642 that are concentric with the locking recess 182. In embodiments, the closure 508 can include the lower mounting plate 166 and the cam plate 190 and a chamber sealing cap 620. As shown in FIGS. 14A-15, 17A, and 17B, the chamber sealing cap 620 can include a downward extension 644 that includes a groove 622 for receiving an O-ring 624 similar to the groove 222 and the O-ring 224 of the prior embodiments for engaging a seal surface 634 of the sample chamber 584. As shown in FIGS. 17A and 17B, the downward extension 644 can be sized to extend through the central bore 640 for engaging the seal surface of the sample chamber 584 mounted therebelow. In embodiments, the closure 308 can be moved from the open configuration to the closed and sealed configuration and can be unsealed and opened in a similar or identical manner as the closure 108 of the prior embodiments.

FIGS. 19A-21B show a closure 708 for a pycnometric device according to another embodiment of the disclosure, which embodiment is generally similar to the prior embodiments except for variations noted and variations that will be apparent to one of ordinary skill in the art. Accordingly, similar or identical features of the embodiments have been given like or similar reference numbers.

In the embodiment of FIGS. 19A-21B, the closure 708 is similar to the closure 108 of FIGS. 4A-5 except that the closure 708 further includes a seal plate 850 mounted on the closure 708 proximate, adjacent, and/or abutting the lower mounting plate 166. As shown in FIGS. 20A-21B, the closure shaft 164, the mounting plates 162, 166, the cam plate 190, and the seal plate 850 have been removed from the swing arm 120 and the handle 160 for illustrating the seal plate 850 and the operation of the seal plate. In embodiments, the seal plate 850 can have a hole 852 that receives the closure shaft 164, wherein the hole 852 can have a loose/clearance fit with the closure shaft 164 so that the seal plate 850 and the closure shaft 164 are free to rotate (and/or are at least partially free to rotate) relative to one another in exemplary embodiments. In embodiments, the seal plate 850 can be prevented from translating along the closure shaft 164 (e.g., away from the lower mounting plate 166), such as by a shoulder formed in the closure shaft 164 and/or a retaining plate.

As shown in FIGS. 20A-21B, the seal plate 850 can have an outer diameter configured so that the outer edge 854 of the seal plate 850 is received within the opening 188a of the insulation block 188 (e.g., is tightly received in the opening 188a) so that the seal plate 850 at least partially forms a seal with the insulation block 188 when the closure 708 is in the inserted position and/or the closed position. Accordingly, the seal plate 850 and the insulation block 188 can cooperate to seal or partially seal the locking recess 182. In other embodiments, the seal plate 850 can have a larger diameter than the opening 188a of the insulation block 188 so that the bottom surface of the seal plate 850 at least partially seals against an upper surface of the insulation block 188 around the opening 188a.

In embodiments, the pycnometric device can include a purge system for removing and/or reducing fluids (e.g., moisture) from the locking recess 182. For example, when the closure 708 is in the closed and locked position and the seal plate 850 is at least partially sealed against the insulation block 188, a fluid (e.g., any suitable low moisture, dry, and/or inert gases, and/or other suitable fluid media) can be moved through the locking recess 182 and/or along the surfaces of the cam plate 190 and/or the lower mounting plate 166 to help remove moisture and/or other substances from the locking recess 182 before, during, and/or after a measurement operation of the pycnometric device. In some embodiments, wherein the ambient air includes moisture and the pycnometric device operates at a temperature below ambient temperature (e.g., approximately 4° C. or any suitable temperature), that moisture can condense in the locking recess 182 during a measurement operation of the pycnometric device. In embodiments, moisture can contaminate a sample when removing the sample from the sample chamber 184 or when adding a new sample to the sample chamber 184 after a prior measurement operation, can interfere with the seal of the sample chamber 184 (e.g., between the seal surface 234 and the O-ring 224), etc. Purging the area around the seal and sample chamber to at least partially remove the moisture/humid ambient air in the locking recess 182 when the closure 708 is in the closed position and before and/or during a measurement operation can be done to help avoid such issues.

Figure 19A:
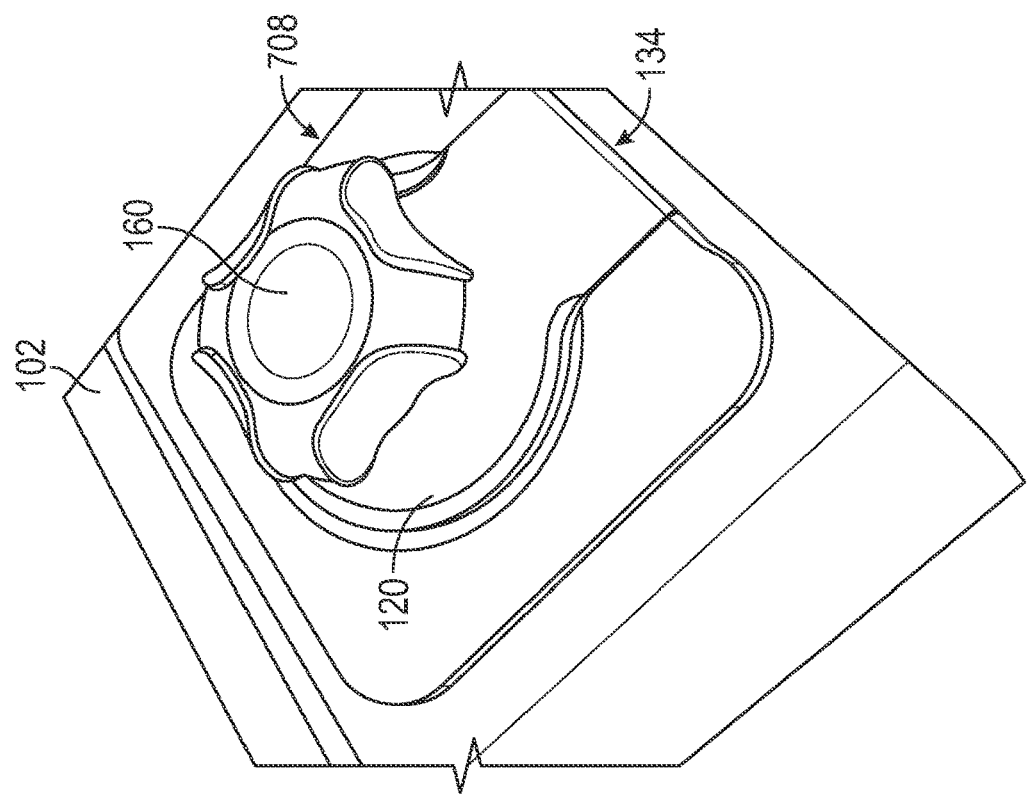
FIGS. 19A and 19B are perspective views of a pycnometric device with an alternative closure according to further embodiments of the disclosure.
Figure 19B:
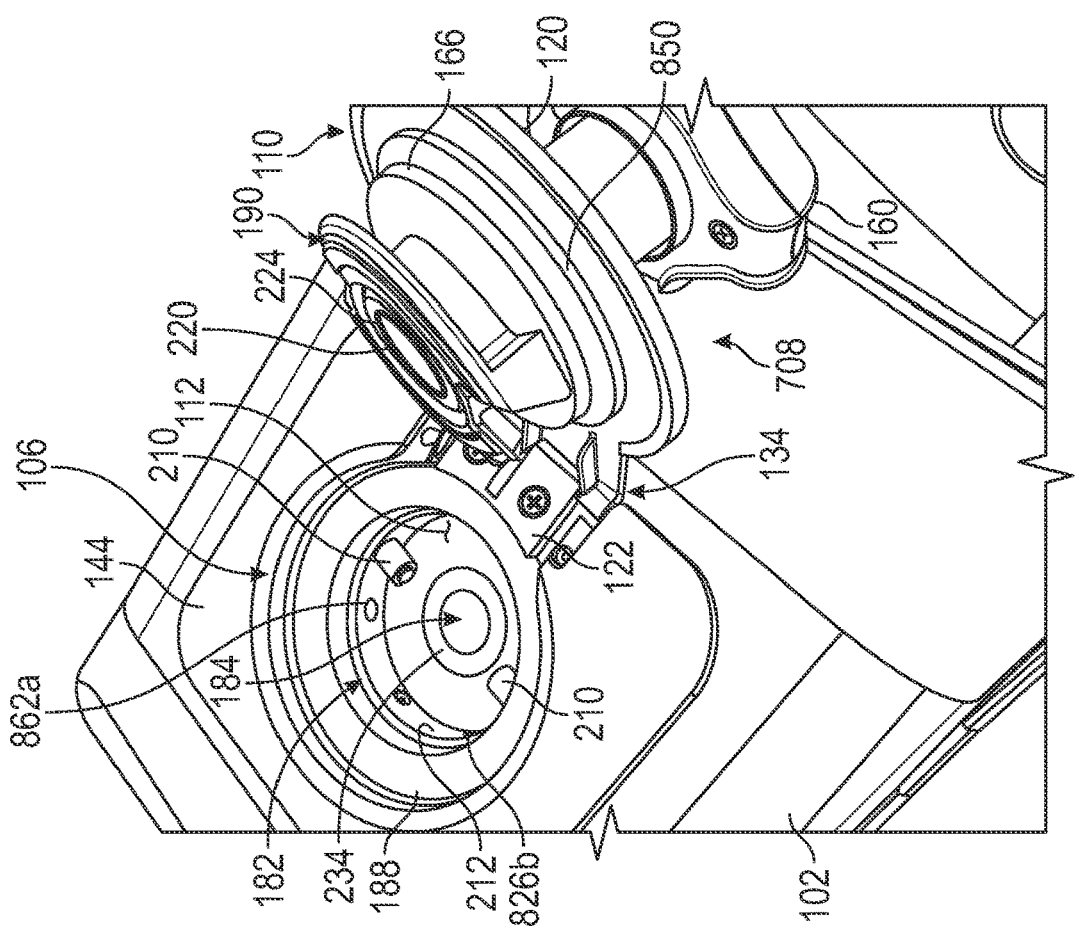
Figure 20B:
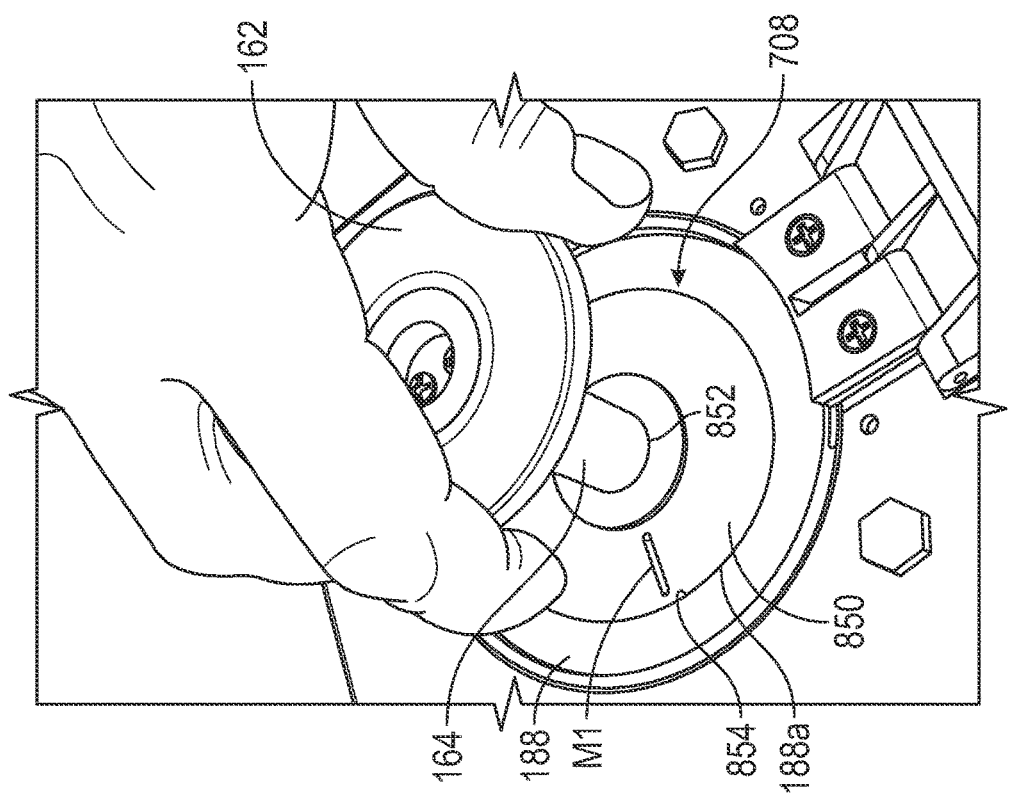
FIGS. 20A-21B are perspective views showing the insertion and closing of the closure of FIGS. 19A and 19B with the pycnometric device according to embodiments of the disclosure.
Figure 20A:
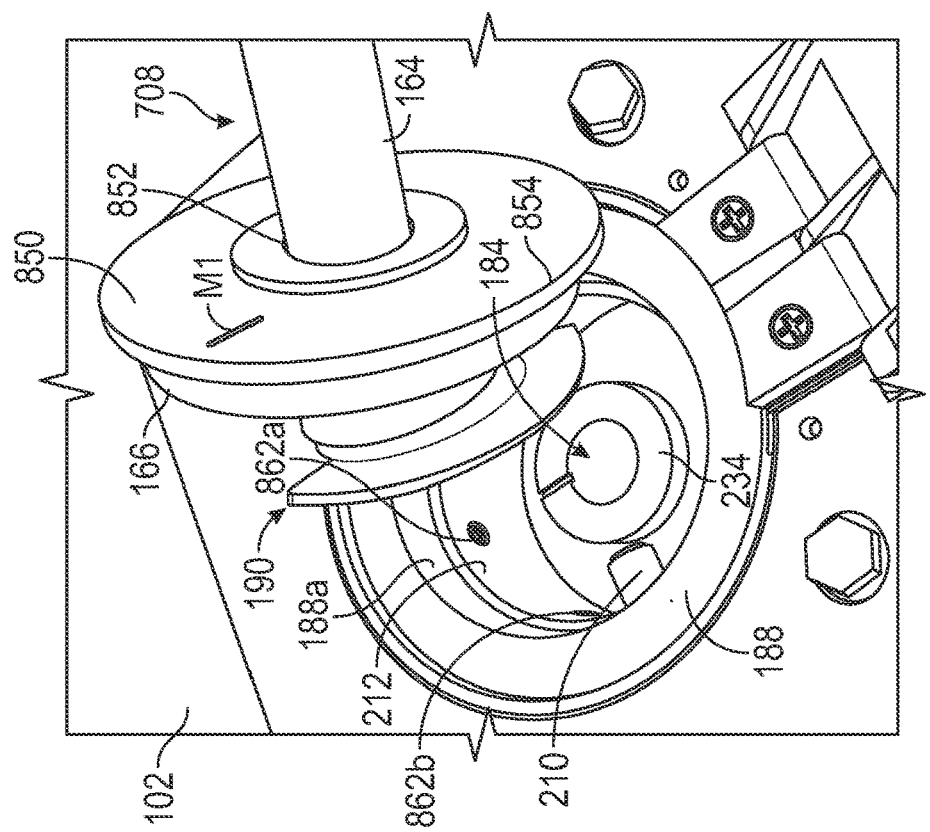

In exemplary embodiments, the purge system can include an inlet port 862a and an outlet portion 862b, each in the interior wall 212 of the locking recess 182 (FIGS. 19A and 20A). The inlet port 862a can be in selective communication with a fluid source (not shown) for moving the purge fluid into the locking recess 182 (e.g., when the closure 708 is in the closed and locked position), and the outlet port 862b can be in communication with an exhaust feature (e.g., for exhaust of the purge fluid to the ambient air). In other embodiments, the outlet port 862b can be in communication with a collection receptacle and/or with a system for treating (e.g., drying) the purge fluid for reuse. In embodiments, the ports 862a, 862b could be located anywhere along the interior wall 212 and/or other surfaces of the locking recess 182. In an example, the purge fluid can flow through the locking recess 182 at rates up to approximately 0.1 liters per minute for a chamber block 180 that is cooled down to approximately 4° C. with an ambient temperature of approximately 35° C. and a relative humidity of approximately 50%. Any suitable flow rate can be used with any suitable temperature difference and relative humidity without departing from the disclosure.

Figure 21B:
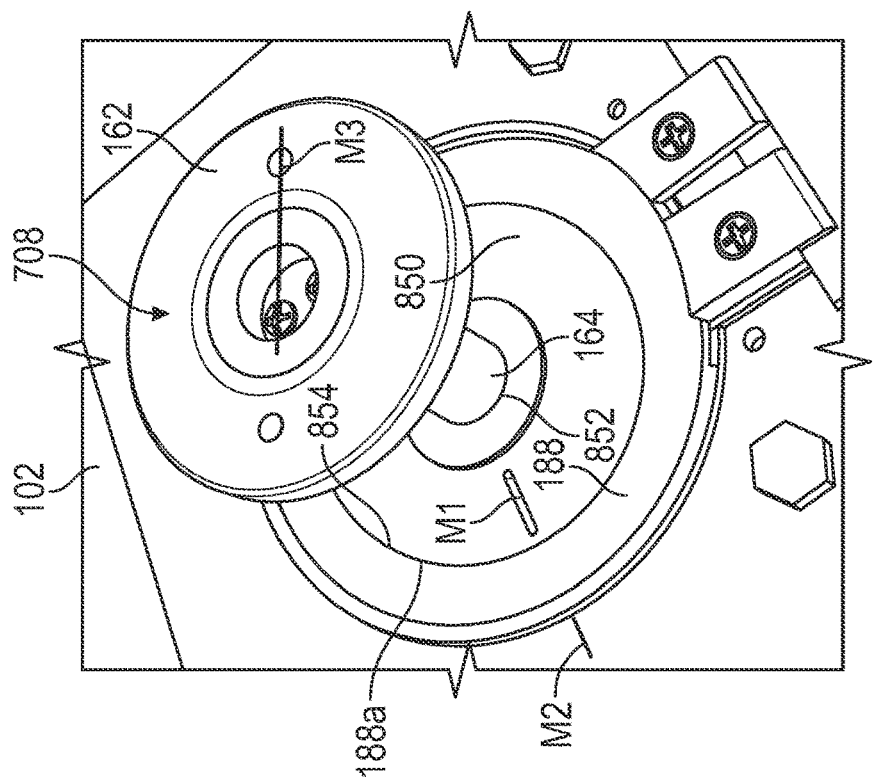
Figure 21A:
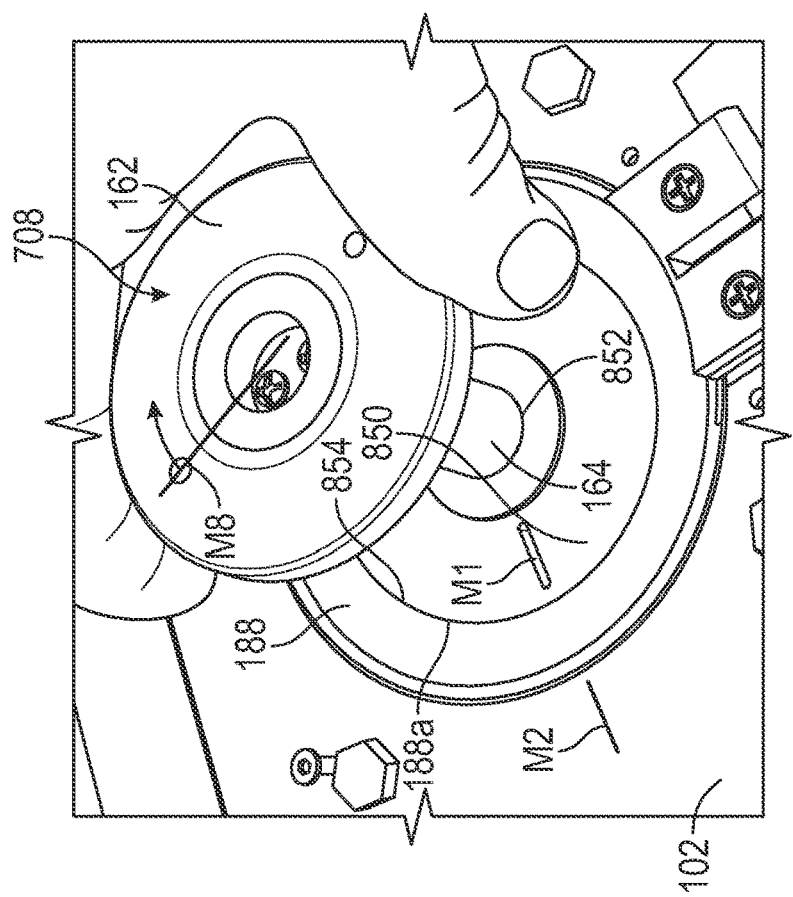

In the view of FIG. 21A, the closure 708 is in the inserted position prior to moving the closure 708 to the closed/locked position. Stated another way, the closure 708 is moved downwardly at least partially into the locking recess 182 with the cam followers 210 aligned with the respective cutouts 194 of the cam plate 190. As shown in FIG. 21A, a marker M1 on the upper surface of the seal plate 850 is aligned with a marker M2 on the outer surface of the housing 102 and a marker M3 on the upper mounting plate 162 is in a first position. In the view of FIG. 21B, the closure 708 is rotated to the closed position (e.g., with the cam followers 210 engaged with the stop features 196 of the cam plate 190) so that the marker M3 on the upper mounting plate 162 is rotated to a second position. As shown in FIG. 21B, the first marker M1 on the seal plate 850 remains aligned with the second marker M2 on the housing 102 since the closure shaft 164 is free to pivot within the hole 852 of the seal plate 850 and the friction between the seal plate 850 and the insulation block 188 can help prevent the seal plate 850 from rotating with the remainder of the closure 708.

Any of the features of the various embodiments of the disclosure can be combined with replaced by, or otherwise configured with other features of other embodiments of the disclosure without departing from the scope of this disclosure.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended aspects.

What is claimed is:

1. A pycnometric device, comprising:
a housing having an access opening;
a swing arm mounted to the housing by a hinge, wherein the swing arm is configured to be selectively pivoted toward and away from the access opening; and
a closure captured by the swing arm, wherein the closure is configured to be selectively moved relative to the swing arm between a retracted position and an inserted position at least partially in the access opening, wherein the swing arm comprises a support cylinder engaging the closure,
wherein the closure comprises locking features for cooperating with engagement features that are configured to extend at least partially within the housing when the closure is moved into a closed and sealed configuration, wherein the closure comprises a closure shaft at least partially received in the support cylinder, and wherein a bearing is mounted between the support cylinder and the closure shaft for facilitating linear and rotational movement of the closure shaft relative to the support cylinder.

2. The pycnometric device of claim 1, wherein the locking features of the closure comprise a cam plate and a cooperating cam follower.

3. The pycnometric device of claim 2, wherein the cam follower cooperates with the cam plate to facilitate moving a sealing portion of the closure into sealing contact around a sample chamber of the pycnometric device when the closure is moved to the closed and sealed configuration.

4. The pycnometric device of claim 1, wherein the swing arm further comprises
a support flange projecting outwardly from the support cylinder, and
a hinge extension extending from the support flange and/or the support cylinder to the hinge.

5. The pycnometric device of claim 2, wherein the cam follower is configured to extend at least partially within a locking recess extending at least partially within the housing when the closure is moved into the closed and sealed configuration.

6. The pycnometric device of claim 5, further comprising an insulation block at least partially extending into the housing.

7. The pycnometric device of claim 6, wherein the closure comprises a seal plate configured to at least partially seal against the insulation block for at least partially sealing the locking recess when the closure is in the closed and sealed configuration.

8. A pycnometric device, comprising:
a housing defining an access opening and a locking recess extending at least partially within the housing;
a swing arm mounted to the housing by a hinge, wherein the swing arm is configured to be selectively pivoted toward and away from the access opening; and
a closure captured by the swing arm, wherein the closure is configured to be selectively moved relative to the swing arm between a retracted position and an inserted position at least partially in the access opening;
wherein the closure comprises a cam plate configured to cooperate with a cam follower configured to extend at least partially within the locking recess when the closure is moved into a closed and sealed configuration.

9. The pycnometric device of claim 8, wherein the cam follower cooperates with the cam plate to facilitate moving a sealing portion of the closure into sealing contact around a sample chamber of the pycnometric device when the closure is moved to the closed and sealed configuration.

10. The pycnometric device of claim 8, wherein the swing arm comprises:

a support cylinder engaging the closure,
a support flange projecting outwardly from the support cylinder, and
a hinge extension extending from the support flange and/or the support cylinder to the hinge.

11. The pycnometric device of claim 8, wherein the closure comprises a closure shaft at least partially received in the support cylinder.

12. The pycnometric device of claim 8, further comprising an insulation block at least partially extending into the housing.

13. The pycnometric device of claim 12, wherein the closure comprises a seal plate configured to at least partially seal against the insulation block for at least partially sealing the locking recess when the closure is in the closed and sealed configuration.

14. A method of operating a pycnometric device, comprising:
pivoting a swing arm about a hinge toward an access opening in a housing of the device, wherein a closure is captured by the swing arm and wherein the closure has locking features that comprise a cam plate and engagement features comprising a cam follower, wherein the cam plate is configured to cooperate with the cam follower to extend at least partially within a locking recess in the housing when the closure is moved into a closed and sealed configuration,
moving the closure from a retracted position to an inserted and/or closed position relative to the swing arm with the closure at least partially received in the access opening;
wherein the closure is biased in a substantially vertical motion such that locking features of the closure are brought into engagement with engagement features in the device to move the closure to the closed and sealed configuration.

15. The method of claim 14, wherein the method moving the closure from the inserted position to the closed and sealed position comprising engaging the cam follower with the cam plate and rotating at least the cam plate so that the engagement between the cam follower and the cam plate causes a sealing portion of the closure to move into sealing contact around a sample chamber of the pycnometric device.

16. The method of claim 15, wherein the swing arm comprises a support cylinder engaging the closure, a support flange extending outwardly from the support cylinder, and a hinge extension extending from the support flange and/or the support cylinder to the hinge.

17. The method of claim 16, wherein the closure comprises a closure shaft at least partially received in the support cylinder, and wherein a bearing is mounted between the support cylinder and the closure shaft for facilitating linear and rotational movement of the closure shaft relative to the support cylinder.

18. The method of claim 17, wherein the locking recess forms a portion of the engagement features and extends at least partially within the housing for at least partially receiving the locking features of the closure, wherein the closure comprises a seal plate, and wherein the moving the closure from the retracted position to the inserted and/or closed position comprises bringing the seal plate into at least partially sealing contact with an insulation block at least partially extending in the housing to at least partially seal the locking recess.

19. The pycnometric device of claim 8, wherein a bearing is mounted between the support cylinder and the closure shaft for facilitating linear and rotational movement of the closure shaft relative to the support cylinder.

20. A pycnometric device, comprising:
a housing having an access opening;
a swing arm mounted to the housing by a hinge, wherein the swing arm is configured to be selectively pivoted toward and away from the access opening, wherein the swing arm comprises:
a support cylinder engaging the closure,
a support flange projecting outwardly from the support cylinder, and
a hinge extension extending from the support flange and/or the support cylinder to the hinge; and
a closure captured by the swing arm, wherein the closure is configured to be selectively moved relative to the swing arm between a retracted position and an inserted position at least partially in the access opening,
wherein the closure comprises locking features for cooperating with engagement features that are configured to extend at least partially within the housing when the closure is moved into a closed and sealed configuration.

* * * * *